US012687389B2

(12) United States Patent
    Paden

(10) Patent No.: US 12,687,389 B2
(45) Date of Patent: Jul. 21, 2026

(54) CALIBRATION OF SCANNING 3-D PERCEPTION SYSTEMS

(71) Applicant: Summer Robotics, Inc., Campbell, CA (US)

(72) Inventor: Brian Alexander Paden, Scotts Valley, CA (US)

(73) Assignee: Summer Robotics, Inc., Campbell, CA (US)

( * ) Notice: Subject to any disclaimer, the term of this patent is extended or adjusted under 35 U.S.C. 154(b) by 156 days.

(21) Appl. No.: 18/671,625

(22) Filed: May 22, 2024

(65) Prior Publication Data

US 2025/0027765 A1    Jan. 23, 2025

Related U.S. Application Data

(60) Provisional application No. 63/503,690, filed on May 22, 2023.

(51) Int. Cl.
    *G01B 11/25*          (2006.01)

(52) U.S. Cl.
    CPC ...... *G01B 11/2504* (2013.01); *G01B 11/2513* (2013.01)

(58) Field of Classification Search
    CPC .................... G01B 11/2504; G01B 11/2513
    See application file for complete search history.

(56) References Cited

U.S. PATENT DOCUMENTS 5,293,265 A   3/1994  Aleshin et al.
5,349,916 A   9/1994  Hillenbrand et al.

5,729,475 A   3/1998  Romanik, Jr.
5,864,417 A   1/1999  Ho
6,318,634 B1  11/2001  Svetal et al.
               (Continued)

FOREIGN PATENT DOCUMENTS

CN      102928431 A    2/2013
CN      109458928 A    3/2019
               (Continued)

OTHER PUBLICATIONS

Office Communication for U.S. Appl. No. 18/113,283 mailed Nov. 4, 2025, 11 Pages.
               (Continued)

*Primary Examiner* — Michael P LaPage
(74) *Attorney, Agent, or Firm* — John W. Branch; Branch Partners PLLC

(57)            ABSTRACT

Embodiments are directed to calibrating a system. A plurality of paths may be scanned across a first object and a second object where the first object is between the second object and scanner. A first portion of trajectories that correspond to a first portion of the paths that trace across the first object may be determined. A second portion trajectories that correspond to a second portion of the paths that trace across the second object may be determined. First endpoints of the first portion of the trajectories may be determined and second endpoints of the second portion of the trajectories may be determined. Rays may be determined based on the second endpoints and the first endpoints. An origin point of the beam generator may be determined based on an intersection of the rays. Accordingly, the system may be calibrated based on the origin point of the beam generator.

28 Claims, 18 Drawing Sheets

(56) References Cited

U.S. PATENT DOCUMENTS

| 6,748,112 B1 | 6/2004 | Nguyen et al. |
| 7,198,195 B2 | 4/2007 | Bobba et al. |
| 8,047,149 B1 | 11/2011 | Antonelli et al. |
| 8,353,457 B2 | 1/2013 | Olmstead |
| 9,117,267 B2 | 8/2015 | Francis, Jr. et al. |
| 9,489,735 B1 | 11/2016 | Reitmayr |
| 10,139,476 B2 | 11/2018 | Leduc et al. |
| 10,213,645 B1 | 2/2019 | Wu et al. |
| 11,703,315 B2 | 7/2023 | Dapore |
| 11,704,835 B2 | 7/2023 | Cullen et al. |
| 11,785,200 B1 | 10/2023 | Smits et al. |
| 11,808,857 B2 | 11/2023 | Cullen et al. |
| 11,887,340 B2 | 1/2024 | Cullen et al. |
| 11,974,055 B1 | 4/2024 | Smits et al. |
| 12,111,180 B2 | 10/2024 | Paden |
| 12,148,185 B2 | 11/2024 | Cullen et al. |
| 12,262,127 B2 | 3/2025 | Smits et al. |
| 12,276,730 B2 | 4/2025 | Smits et al. |
| 12,401,905 B2 | 8/2025 | Smits et al. |
| 12,416,804 B1 | 9/2025 | Smits et al. |
| 12,487,359 B2 | 12/2025 | Cullen |
| 12,511,864 B2 | 12/2025 | Paden |
| 12,536,696 B2 | 1/2026 | Paden et al. |
| 2002/0008791 A1 | 1/2002 | Okamori et al. |
| 2004/0217260 A1* | 11/2004 | Bernardini ............. G06T 7/521 |
| | | 250/208.1 |
| 2007/0090180 A1 | 4/2007 | Griffis et al. |
| 2008/0012850 A1 | 1/2008 | Keating, III |
| 2008/0165360 A1 | 7/2008 | Johnston |
| 2008/0201101 A1 | 8/2008 | Hebert et al. |
| 2009/0087029 A1 | 4/2009 | Coleman et al. |
| 2009/0096994 A1 | 4/2009 | Smits |
| 2011/0122233 A1 | 5/2011 | Kasai et al. |
| 2011/0273442 A1 | 11/2011 | Drost et al. |
| 2014/0105506 A1 | 4/2014 | Drost et al. |
| 2014/0111616 A1* | 4/2014 | Blayvas ................... F21V 9/00 |
| | | 348/46 |
| 2014/0368614 A1 | 12/2014 | Imai et al. |
| 2015/0378023 A1 | 12/2015 | Royo Royo et al. |
| 2016/0096477 A1 | 4/2016 | Biemer |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0068861 A1 | 3/2017 | Miller et al. |
| 2017/0142393 A1 | 5/2017 | Oggier |
| 2017/0176575 A1 | 6/2017 | Smits |
| 2017/0195589 A1 | 7/2017 | Kovacovsky et al. |
| 2018/0180733 A1 | 6/2018 | Smits |
| 2019/0072770 A1 | 3/2019 | Hall |
| 2019/0128665 A1 | 5/2019 | Harendt |
| 2019/0213309 A1 | 7/2019 | Morestin et al. |
| 2019/0235081 A1 | 8/2019 | Smits |
| 2019/0258869 A1 | 8/2019 | Stelzer et al. |
| 2019/0279379 A1 | 9/2019 | Srinivasan et al. |
| 2019/0310351 A1 | 10/2019 | Hughes et al. |
| 2020/0075658 A1 | 3/2020 | Kato et al. |
| 2020/0142073 A1 | 5/2020 | Gassend et al. |
| 2020/0160012 A1 | 5/2020 | Nunnink et al. |
| 2020/0264414 A1 | 8/2020 | Svec |
| 2020/0280664 A1 | 9/2020 | Lee et al. |
| 2021/0023714 A1 | 1/2021 | Zhang et al. |
| 2021/0037229 A1 | 2/2021 | Maykol Gomes Pinto et al. |
| 2021/0080548 A1 | 3/2021 | Beuschel et al. |
| 2021/0141094 A1 | 5/2021 | Russ et al. |
| 2021/0261159 A1 | 8/2021 | Pazhayampallil et al. |
| 2021/0278539 A1 | 9/2021 | Laddha et al. |
| 2021/0304574 A1 | 9/2021 | Ramanathan et al. |
| 2022/0156998 A1 | 5/2022 | Lee et al. |
| 2022/0187461 A1 | 6/2022 | Cullen |
| 2022/0222845 A1 | 7/2022 | Inada |
| 2022/0287676 A1 | 9/2022 | Steines et al. |
| 2022/0307823 A1* | 9/2022 | Liu ................... G01B 11/2513 |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0169683 A1 | 6/2023 | Paden et al. |
| 2023/0230212 A1 | 7/2023 | García et al. |
| 2023/0274523 A1 | 8/2023 | Paden et al. |
| 2023/0316657 A1 | 10/2023 | Smits et al. |
| 2023/0360268 A1 | 11/2023 | Cullen et al. |
| 2024/0022819 A1 | 1/2024 | Smits et al. |
| 2024/0040274 A1 | 2/2024 | Smits et al. |
| 2024/0114235 A1 | 4/2024 | Gallagher et al. |
| 2024/0129645 A1 | 4/2024 | Smits et al. |
| 2024/0329248 A1 | 10/2024 | Smits et al. |
| 2025/0056133 A1 | 2/2025 | Smits et al. |
| 2025/0221800 A1* | 7/2025 | Kjær ................... H04N 13/246 |
| 2025/0277901 A1 | 9/2025 | Smits et al. |
| 2025/0321337 A1 | 10/2025 | Smits et al. |
| 2025/0383539 A1 | 12/2025 | Smits |

FOREIGN PATENT DOCUMENTS

| CN | 112365585 A | 2/2021 | |
| CN | 112750168 A | 5/2021 | |
| CN | 113313710 A | 8/2021 | |
| CN | 115115760 A | 9/2022 | |
| CN | 116829902 A | 9/2023 | |
| EP | 2642246 B1 * | 5/2021 | ............. H04N 23/00 |
| EP | 4260006 A1 | 6/2022 | |
| JP | H06-94428 A | 4/1994 | |
| JP | H11-64229 A | 3/1999 | |
| JP | 2000-231344 A | 8/2000 | |
| JP | 2009-243986 A | 10/2009 | |
| JP | 2018-195240 A | 12/2018 | |
| JP | 2020-52719 A | 4/2020 | |
| JP | 2020-64011 A | 4/2020 | |
| JP | 2020-514713 A | 5/2020 | |
| JP | 2020-106475 A | 7/2020 | |
| JP | 2021-167776 A | 10/2021 | |
| JP | 2024-501078 A | 1/2024 | |
| JP | 7826332 B2 | 3/2026 | |
| KR | 10-2021-0075563 A | 6/2021 | |
| WO | 2013/093459 A2 | 6/2013 | |
| WO | 2014/060564 A1 | 4/2014 | |
| WO | 2018/000037 A1 | 1/2018 | |
| WO | 2018/125850 A1 | 7/2018 | |
| WO | 2019/189381 A1 | 10/2019 | |
| WO | 2020/061214 A1 | 3/2020 | |
| WO | 2020/080237 A1 | 4/2020 | |
| WO | 2021/039022 A1 | 3/2021 | |
| WO | 2021/140886 A1 | 7/2021 | |
| WO | 2022/132828 A1 | 6/2022 | |
| WO | 2023/278868 A1 | 1/2023 | |
| WO | 2023/288067 A1 | 1/2023 | |
| WO | 2023/009755 A1 | 2/2023 | |
| WO | 2023/028226 A1 | 3/2023 | |
| WO | 2023/096873 A1 | 6/2023 | |
| WO | 2023/164064 A1 | 8/2023 | |
| WO | 2023/177692 A1 | 9/2023 | |
| WO | 2023/196225 A1 | 10/2023 | |
| WO | 2024/025865 A1 | 2/2024 | |
| WO | 2025/264865 A1 | 12/2025 | |

OTHER PUBLICATIONS

Office Communication for U.S. Appl. No. 18/113,283 mailed Nov. 18, 2025, 2 Pages.

International Search Report and Written Opinion for International Patent Application No. PCT/US2021/063399 mailed Mar. 22, 2022, 6 Pages.

International Search Report and Written Opinion for International Patent Application No. PCT/US2022/036006 mailed Oct. 4, 2022, 7 Pages.

International Search Report and Written Opinion for International Patent Application No. PCT/US2022/037299 mailed Oct. 25, 2022, 6 Pages.

International Search Report and Written Opinion for International Patent Application No. PCT/US2022/038724 mailed Nov. 1, 2022, 6 Pages.

(56) References Cited

OTHER PUBLICATIONS

International Search Report and Written Opinion for International Patent Application No. PCT/US2022/041520 mailed Nov. 8, 2022, 6 Pages.

Office Communication for U.S. Appl. No. 17/876,333 mailed Feb. 21, 2023, 22 Pages.

Office Communication for U.S. Appl. No. 17/876,333 mailed Mar. 1, 2023, 2 Pages.

International Search Report and Written Opinion for International Patent Application No. PCT/US2022/050626 mailed Mar. 7, 2023, 8 Pages.

Office Communication for U.S. Appl. No. 17/895,489 mailed Apr. 11, 2023, 36 Pages.

International Search Report and Written Opinion for International Patent Application No. PCT/US2023/013718 mailed May 30, 2023, 7 Pages.

Office Communication for U.S. Appl. No. 18/130,080 mailed Jun. 20, 2023, 36 Pages.

Office Communication for U.S. Appl. No. 17/895,489 mailed Jul. 5, 2023, 13 Pages.

International Search Report and Written Opinion for International Patent Application No. PCT/US2023/015227 mailed Jun. 27, 2023, 7 Pages.

International Preliminary Report on Patentability for International Patent Application No. PCT/US2021/063399 mailed Jun. 29, 2023, 5 Pages.

International Search Report and Written Opinion for International Patent Application No. PCT/US2023/017271 mailed Jul. 11, 2023, 7 Pages.

Office Communication for U.S. Appl. No. 18/121,486 mailed Aug. 16, 2023, 2 Pages.

Office Communication for U.S. Appl. No. 18/121,486 mailed Aug. 3, 2023, 11 Pages.

Office Communication for U.S. Appl. No. 18/222,780 mailed Sep. 15, 2023, 10 Pages.

Office Communication for U.S. Appl. No. 18/130,080 mailed Sep. 28, 2023, 43 Pages.

Office Communication for U.S. Appl. No. 18/225,833 mailed Sep. 15, 2023, 19 Pages.

International Search Report and Written Opinion for International Patent Application No. PCT/US2023/028551 mailed Oct. 24, 2023, 09 Pages.

Office Communication for U.S. Appl. No. 17/551,054 mailed Jul. 16, 2024, 12 Pages.

Office Communication for U.S. Appl. No. 17/856,690 mailed Jul. 10, 2024, 11 Pages.

Office Communication for U.S. Appl. No. 17/856,690 mailed Jul. 24, 2024, 4 Pages.

International Preliminary Report on Patentability for International Patent Application No. PCT/US2022/036006 mailed Jan. 11, 2024, 6 Pages.

International Preliminary Report on Patentability for International Patent Application No. PCT/US2022/037299 mailed Jan. 25, 2024, 5 Pages.

International Preliminary Report on Patentability for International Patent Application No. PCT/US2022/038724 mailed Feb. 8, 2024, 5 Pages.

International Preliminary Report on Patentability for International Patent Application No. PCT/US2022/041520 mailed Mar. 7, 2024, 5 Pages.

International Preliminary Report on Patentability for International Patent Application No. PCT/US2022/050626 mailed Jun. 6, 2024, 6 Pages.

Office Communication for U.S. Appl. No. 18/488,123 mailed Jan. 2, 2024, 10 Pages.

Office Communication for U.S. Appl. No. 17/865,794 mailed Aug. 21, 2024, 12 Pages.

International Preliminary Report on Patentability for International Patent Application No. PCT/US2023/015227 mailed Sep. 26, 2024, 5 Pages.

Office Communication for U.S. Appl. No. 18/504,052 mailed Aug. 22, 2024, 7 Pages.

International Preliminary Report on Patentability for International Patent Application No. PCT/US2023/013718 mailed Sep. 6, 2024, 5 Pages.

International Preliminary Report on Patentability for International Patent Application No. PCT/US2023/017271 mailed Oct. 17, 2024, 5 Pages.

Office Communication for U.S. Appl. No. 18/618,909 mailed Nov. 20, 2024, 9 Pages.

Extended European Search Report for European Patent Application No. 21907668.4 mailed on Dec. 6, 2024, 10 pages.

Office Communication for U.S. Appl. No. 18/221,816 mailed Dec. 6, 2024, 27 Pages.

Office Communication for U.S. Appl. No. 18/504,052 mailed Dec. 9, 2024, 6 Pages.

International Preliminary Report on Patentability for International Patent Application No. PCT/US2023/028551 mailed Feb. 6, 2025, 07 Pages.

Office Communication for U.S. Appl. No. 18/221,816 mailed May 14, 2025, 9 Pages.

Office Communication for U.S. Appl. No. 17/551,054 mailed Oct. 30, 2025, 2 Pages.

Office Communication for U.S. Appl. No. 17/991,610 mailed Dec. 9, 2025, 10 Pages.

Office Communication for U.S. Appl. No. 17/991,610 mailed Dec. 17, 2025, 2 Pages.

International Search Report and Written Opinion for International Patent Application No. PCT/US2021/063399 mailed Jun. 29, 2023, 5 Pages.

International Search Report and Written Opinion for International Patent Application No. PCT/US2022/036006 mailed Jan. 11, 2024, 6 Pages.

International Search Report and Written Opinion for International Patent Application No. PCT/US2022/037299 mailed Jan. 25, 2024, 5 Pages.

International Search Report and Written Opinion for International Patent Application No. PCT/US2022/038724 mailed Feb. 8, 2024, 5 Pages.

International Search Report and Written Opinion for International Patent Application No. PCT/US2022/041520 mailed Mar. 7, 2024, 5 Pages.

International Search Report and Written Opinion for International Patent Application No. PCT/US2022/050626 mailed Jun. 6, 2024, 6 Pages.

International Search Report and Written Opinion for International Patent Application No. PCT/US2025/034271 mailed Sep. 9, 2025, 9 Pages.

Ahn et al., "Kaleidoscopic structured light", ACM Transactions on Graphics, vol. 40, Issue 6, No. 214, Dec. 2021, pp. 1-15.

Office Communication for U.S. Appl. No. 17/551,054 mailed Oct. 22, 2025, 8 Pages.

Office Communication for U.S. Appl. No. 17/551,054 mailed May 27, 2025, 26 Pages.

Extended European Search Report for European Patent Application No. 22862080.3 mailed Jun. 16, 2025, 6 Pages.

Li et al., "Enhancing 3-D LiDAR Point Clouds With Event-Based Camera", IEEE Transactions on Instrumentation and Measurement, vol. 70, 9511712, 2021, 12 pages.

Gehriu et al., "DSEC: A Stereo Event Camera Dataset for Driving Scenarios", IEEE Robotics and Automation Letters, Preprint Version, Accepted Feb. 2021, 8 pages.

Office Communication for U.S. Appl. No. 19/203,054 mailed Jul. 7, 2025, 10 Pages.

Office Communication for U.S. Appl. No. 18/113,283 mailed Jul. 16, 2025, 13 Pages.

Office Communication for U.S. Appl. No. 17/551,054 mailed Aug. 4, 2025, 3 Pages.

Office Communication for JP Patent Application No. 2023-560251 mailed Sep. 1, 2025, 7 Pages including English Translation.

Office Communication for U.S. Appl. No. 19/035,554 mailed Aug. 7, 2025, 8 Pages.

(56) References Cited

OTHER PUBLICATIONS

Office Communication for U.S. Appl. No. 19/242,542 mailed Aug. 6, 2025, 8 Pages.

Office Communication for U.S. Appl. No. 19/242,542 mailed Aug. 26, 2025, 10 Pages.

Office Communication for U.S. Appl. No. 19/059,517 mailed Aug. 12, 2025, 23 Pages.

Liu et al., "Automatic fishing net detection and recognition based on optical gated viewing for underwater obstacle avoidance," Optical Engineering, vol. 56 No. 8, Aug. 2017, pp. 083101-1-083101-7.

Russell et al., "Underwater spectral reflectance measurements: the reflectance standard submersion factor and its impact on derived target reflectance," Applied Optics, vol. 62, No. 24, Aug. 20, 2023, pp. 6299-6306.

Weng et al., "Scalable laser-based underwater wireless optical communication solution between autonomous underwater vehicle fleets," Applied Optics, vol. 62, No. 31, Nov. 2023, pp. 8261-8271.

Office Communication for JP Patent Application No. 2023-560251 mailed Feb. 5, 2026, 5 Pages including English Translation.

Office Communication for U.S. Appl. No. 19/242,542 mailed Mar. 2, 2026, 11 Pages.

European Office Action for European Patent Application No. 21907668.4 mailed on Mar. 19, 2026, 6 pages.

Office Communication for U.S. Appl. No. 19/242,542 mailed May 7, 2026, 4 Pages.

* cited by examiner

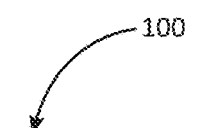
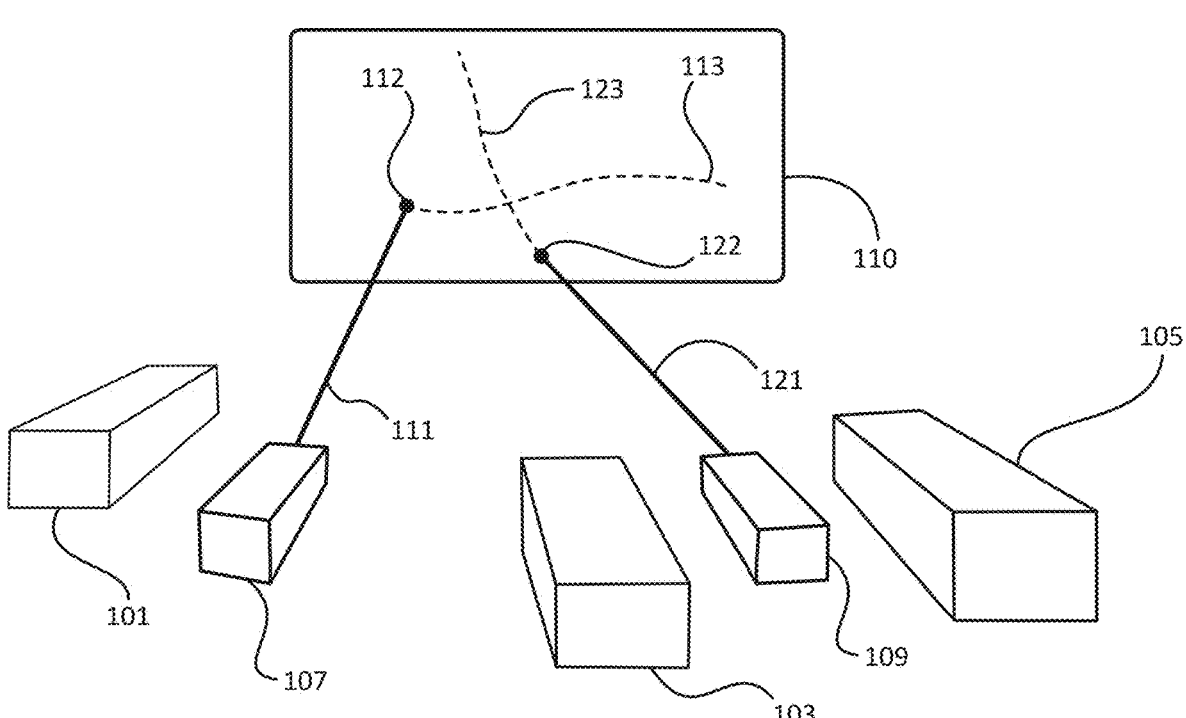
FIG. 1A

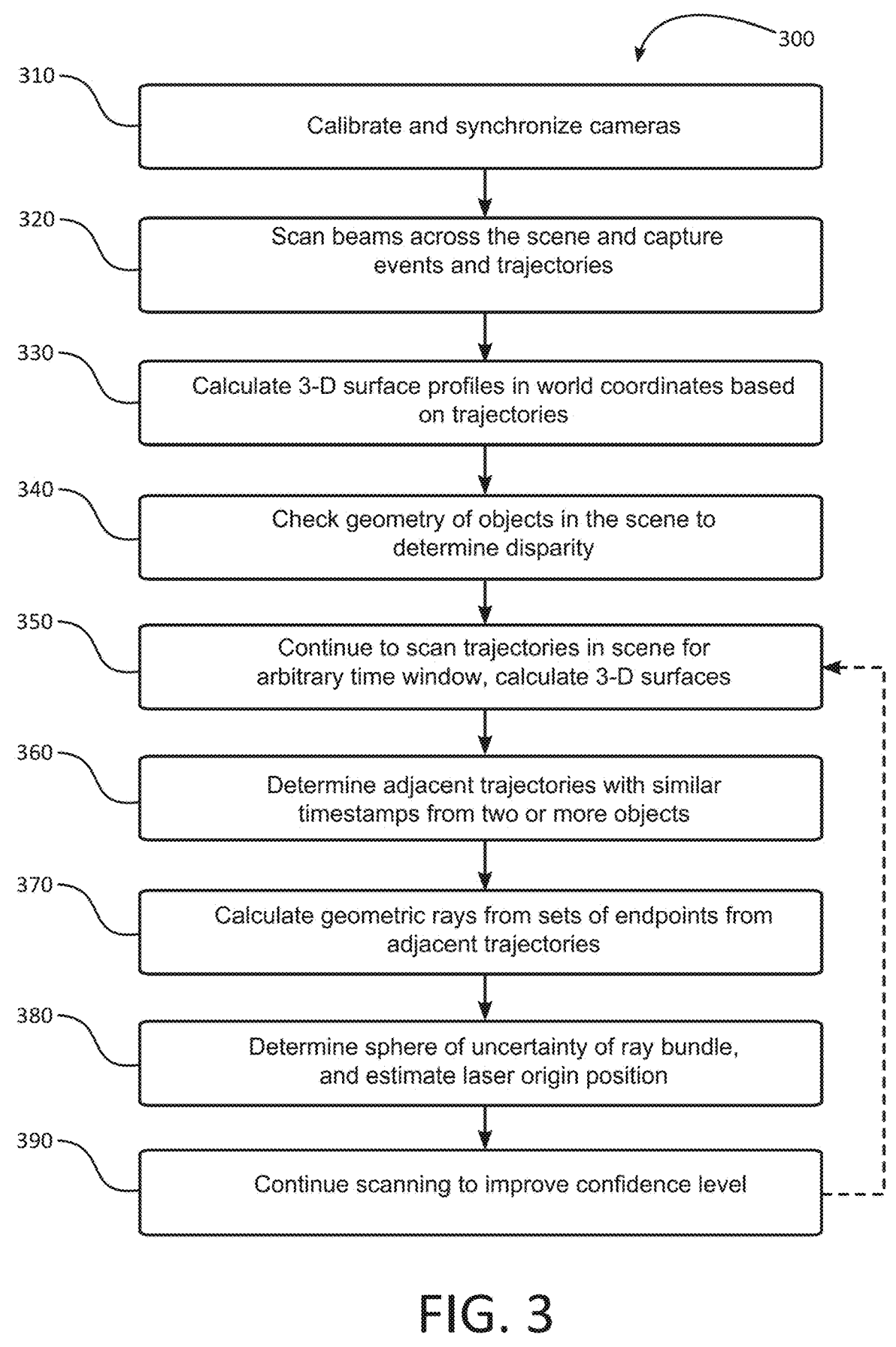

300

310 — Calibrate and synchronize cameras

320 — Scan beams across the scene and capture events and trajectories

330 — Calculate 3-D surface profiles in world coordinates based on trajectories

340 — Check geometry of objects in the scene to determine disparity

350 — Continue to scan trajectories in scene for arbitrary time window, calculate 3-D surfaces 360 — Determine adjacent trajectories with similar timestamps from two or more objects 370 — Calculate geometric rays from sets of endpoints from adjacent trajectories 380 — Determine sphere of uncertainty of ray bundle, and estimate laser origin position 390 — Continue scanning to improve confidence level

FIG. 3

400
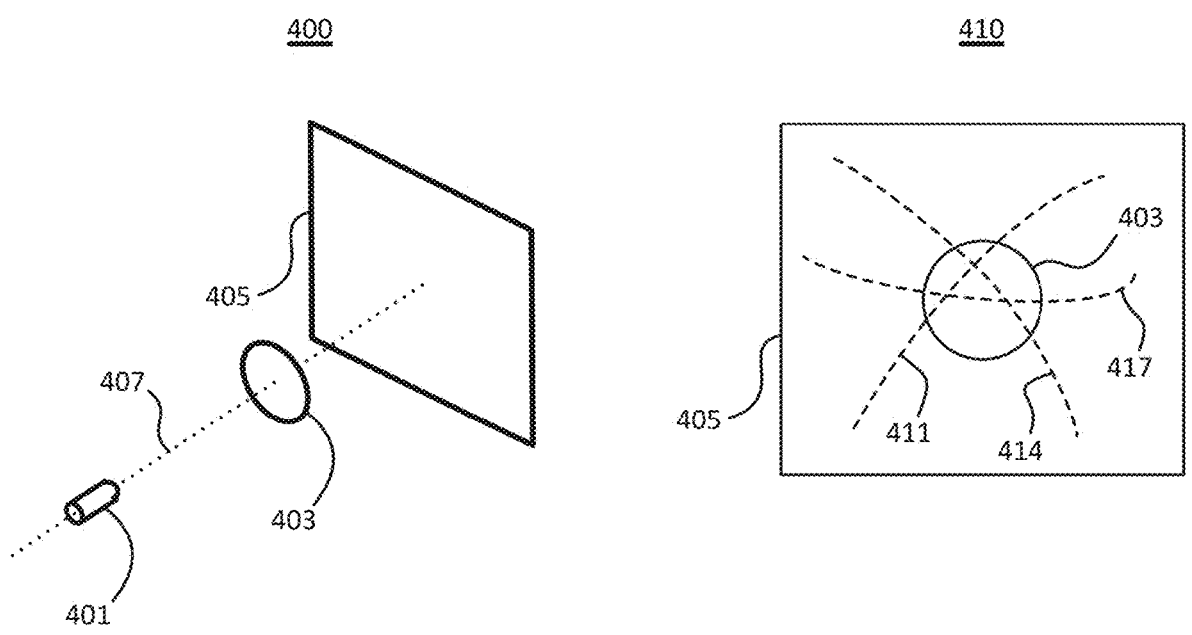
410
420
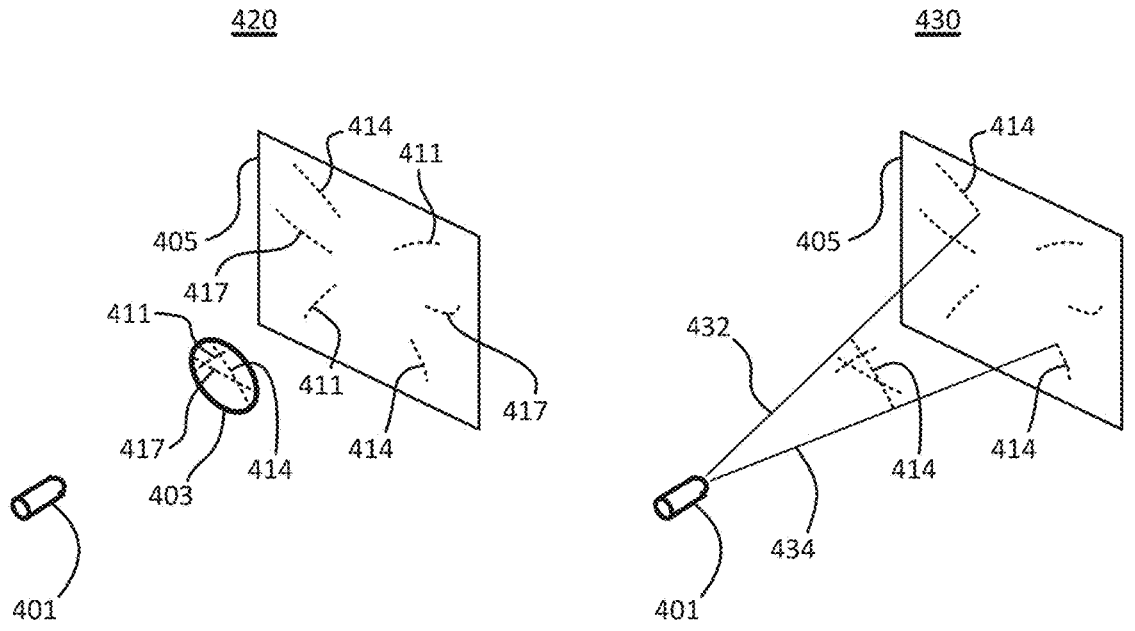
430
FIG. 4A 440
450
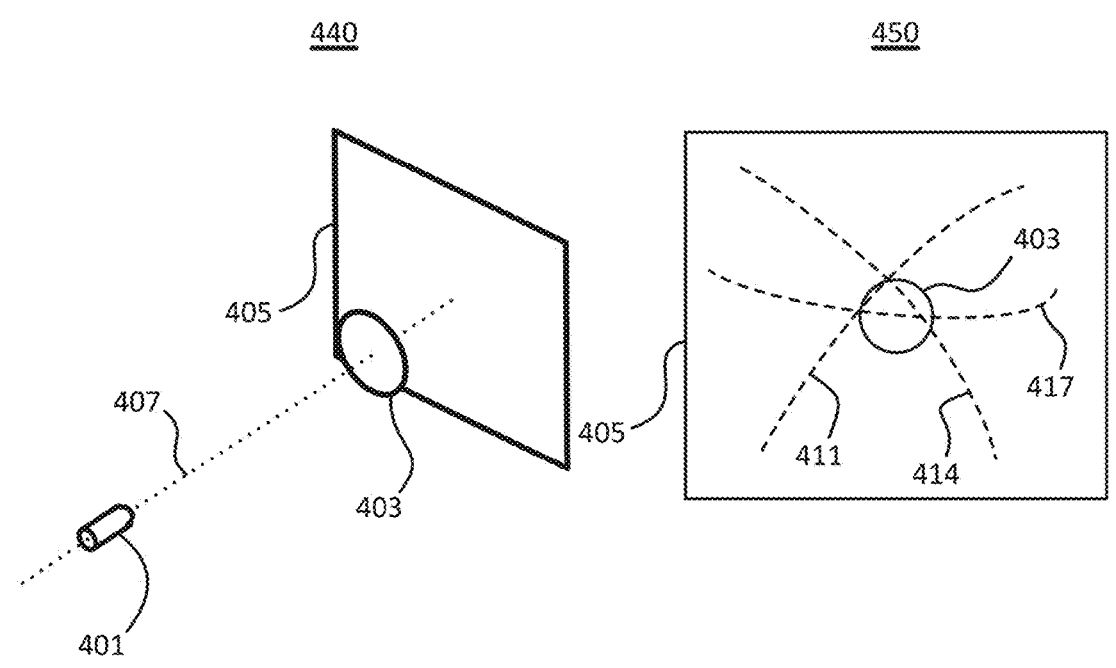
460
470
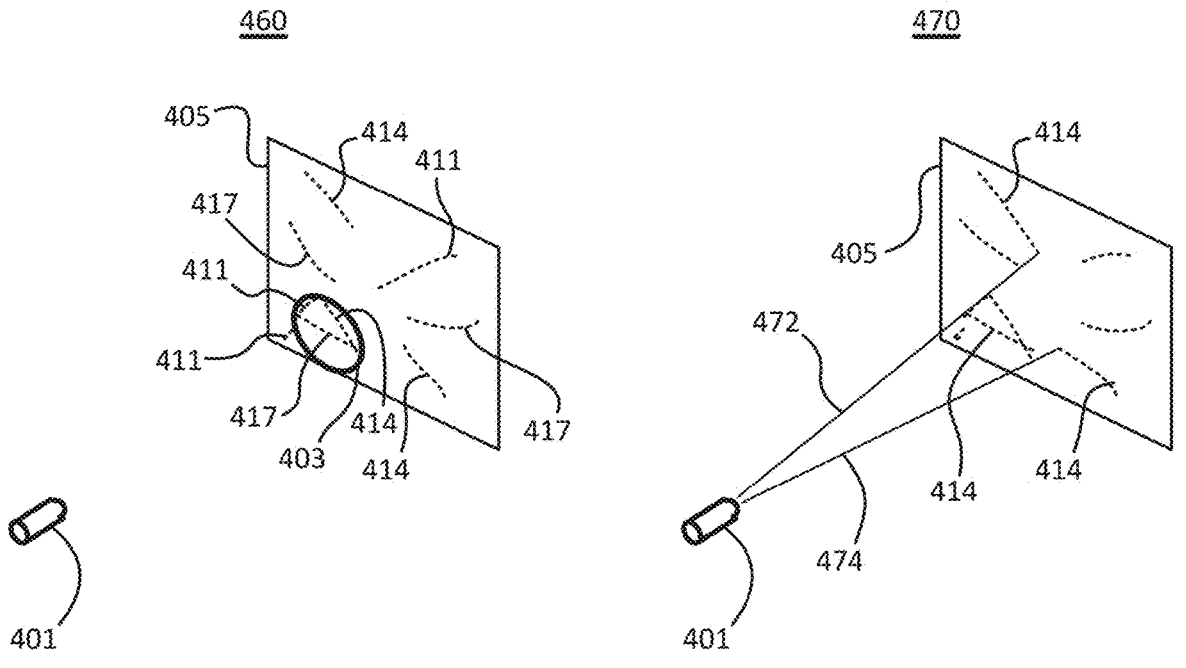
FIG. 4B

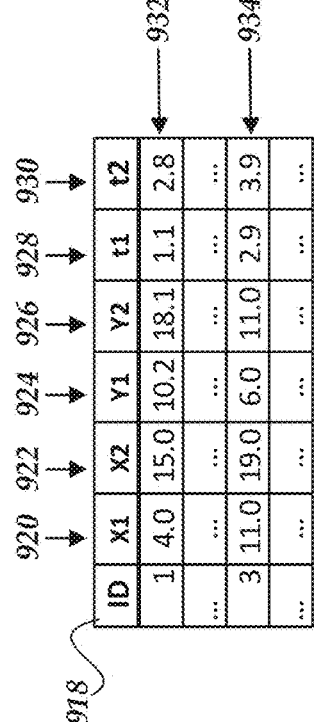
| ID | X | Y | t |
|----|-----|------|-----|
| 11 | 4.0 | 10.2 | 1.1 |
| 12 | 5.0 | 11.3 | 1.2 |
| 13 | 6.0 | 12.0 | 1.3 |
| ... | | | ... |
| ID | X1 | X2 | Y1 | Y2 | t1 | t2 |
|----|------|------|------|------|-----|-----|
| 1 | 4.0 | 15.0 | 10.2 | 18.1 | 1.1 | 2.8 |
| ... | | | | | | ... |
| 3 | 11.0 | 19.0 | 6.0 | 11.0 | 2.9 | 3.9 |
| ... | | | | | | ... |
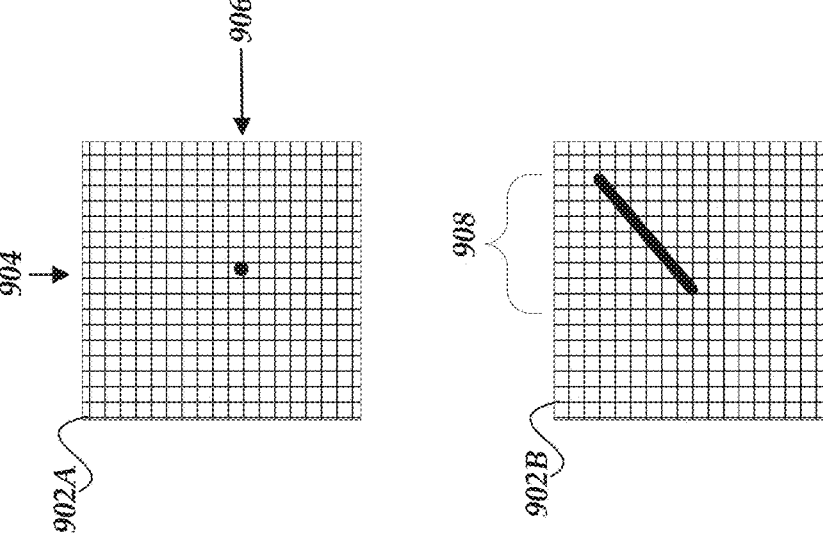
Fig. 9

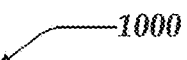
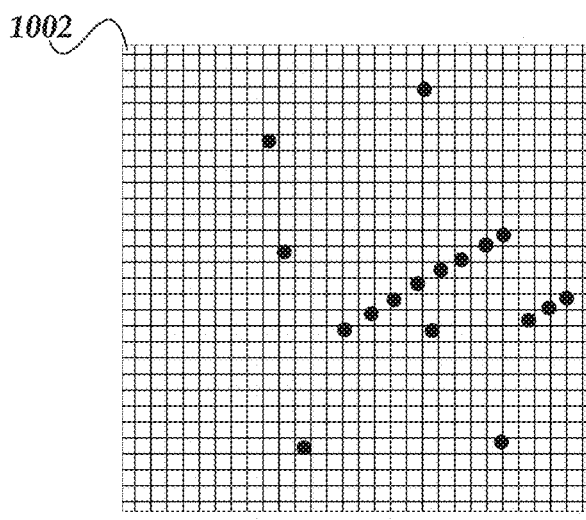
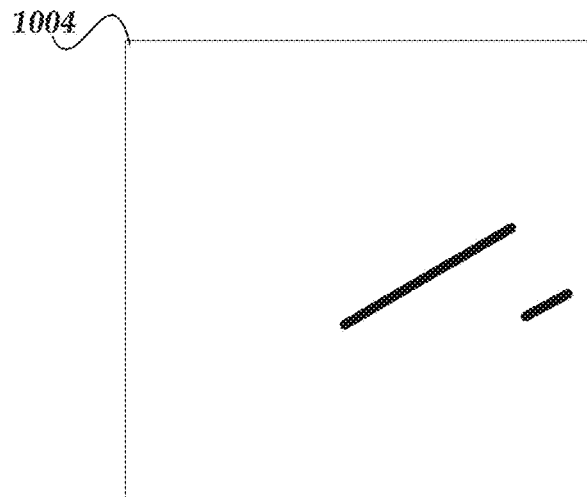
*Fig. 10*

CALIBRATION OF SCANNING 3-D PERCEPTION SYSTEMS

CROSS-REFERENCE TO RELATED APPLICATION

This application is a Utility Patent application based on previously filed U.S. Provisional Patent Application U.S. Ser. No. 63/503,690 filed on May 22, 2023, the benefit of the filing date of which is hereby claimed under 35 U.S.C. § 119(e), and the contents of which is further incorporated in entirety by reference.

TECHNICAL FIELD

The present innovations relate generally to machine sensing or machine vision systems, and more particularly, but not exclusively, to calibration of scanning 3-D perception systems.

BACKGROUND

A laser scanner may emit one or more laser beams in a given pattern. These beams may be reflected from a targeted surface and imaged by two or more camera-like sensors that may detect the projection of the scanner tracks onto their focal plane arrays. Given the relative position of the sensors and the projection of the reflected beam on two or more sensor's focal plane arrays the 3D position of the laser reflections of the targeted surface may be determined by various methods. If only one beam is scanned over the surface, the scanned beam may be unambiguously tracked in all cameras. However, in the case of more than one laser beam scanning simultaneously, it may be difficult to assign tracks associated with a common reflection from the targeted surface in each camera or difficult to locate the position of each laser scanner.

Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 1A is a perspective view of a 3-D perception system according to specific embodiments of the invention;

FIG. 3 is a method of locating a scanner origin point in a 3-D perception system according to specific embodiments of the invention;

FIGS. 4A and 4B are various views of a system illustrating portions of the method of FIG. 3;

FIG. 9 illustrates a logical representation of sensors and sensor output information for perceiving scene features using event sensors and image sensors in accordance with one or more of the various embodiments;

FIG. 10 illustrates a logical schematic of a system for perceiving scene features using event sensors and image sensors in accordance with one or more of the various embodiments;

DETAILED DESCRIPTION OF VARIOUS EMBODIMENTS

Figure 1B:
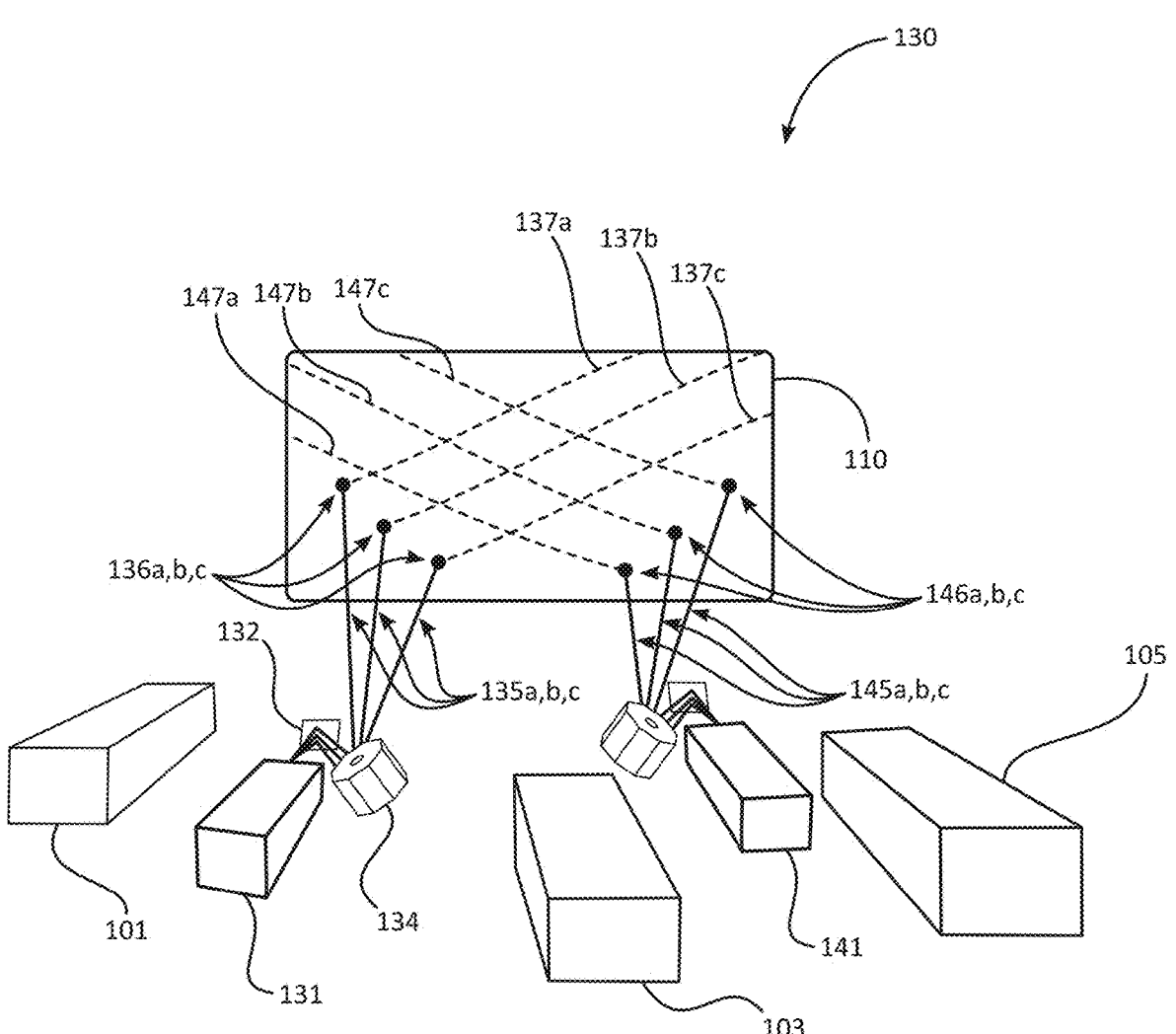
FIG. 1B is a perspective view of a 3-D perception system according to specific embodiments of the invention.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the present innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," "signal generator," "scanning beam," "scanning lasers," "scanning laser beam," or "beam scanner" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor," "event camera sensor," or "event camera" refer to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the terms "image sensor," or "frame camera" refer to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used to collect event information.

As used herein the terms "trajectory," "parametric trajectory," "surface trajectory" refer to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to calibrating a system. In one or more of the various embodiments, a plurality of paths may be scanned across a first object and a second object such that the plurality of paths may be generated by a beam generator and such that the first object may be disposed between the second object and the beam generator.

In one or more of the various embodiments, a plurality of trajectories may be determined based on one or more paths that trace across the first object and the second object.

In one or more of the various embodiments, one or more breaks in the one or more paths may be employed to determine a first portion of the plurality of trajectories that correspond to a first portion of the one or more paths that trace across the first object and the one or more breaks in the one or more paths may be employed to determine a second portion of the plurality of trajectories that correspond to second portion of the one or more paths that trace across the second object.

In one or more of the various embodiments, one or more first endpoints of the first portion of the trajectories may be determined and one or more second endpoints of the second portion of the trajectories may be determined based on the one or more breaks in the one or more paths.

In one or more of the various embodiments, two or more rays may be determined based on the one or more second endpoints and the one or more first endpoints.

In one or more of the various embodiments, an origin point of the beam generator may be determined based on an intersection of the two or more rays.

In one or more of the various embodiments, the system may be calibrated based on the origin point of the beam generator.

In one or more of the various embodiments, determining the origin point of the beam generator may include: determining two or more intersections based on a bundle of three or more determined rays; updating the origin point based on an average location of the two or more intersections; or the like.

In one or more of the various embodiments, determining the plurality of trajectories may include: determining another portion of the plurality of trajectories based on one or more other paths that trace across two or more other objects that are scanned by the beam generator; determining two or more other rays based on one or more endpoints associated with the other portion of the plurality of trajectories; updating the origin point of the beam generator based on an intersection of the two or more other rays; or the like.

In one or more of the various embodiments, determining the plurality of trajectories may include: generating a plurality of events based on energy from the beam that is reflected to a sensor by one or more of the first object or the second object such that each event may be associated with an x-axis value and a y-axis value that corresponds to a pixel location in the sensor and such that each event may be associated with a timestamp that corresponds to a time the event may be generated; such that the plurality of trajectories may be based on one or more portions of the plurality of events that correspond to the one or more paths; or the like.

In one or more of the various embodiments, one or more timestamps associated with one or more candidate trajectories may be determined such that each timestamp may be associated with an endpoint of the one or more candidate trajectories. In some embodiments, a portion of the one or more candidate trajectories may be excluded from the plurality of trajectories based on a difference between the one or more timestamps exceeding a threshold value.

In one or more of the various embodiments, determining the two or more rays may include: geometrically projecting each ray from a second endpoint to a first endpoint such that the second endpoint and the first endpoint are associated with two separate trajectories that may be associated with a same path.

In one or more of the various embodiments, a positional disparity between the first object and the second object may be determined based on the plurality of trajectories. In some embodiments, a confidence score may be associated with the origin point based on a value of the positional disparity such that the confidence score may be proportional to a magnitude of the positional disparity.

DETAILED DESCRIPTION

FIG. 1A is a logical schematic of system 100 showing a plurality of beams scanning over objects in accordance with one or more of the various embodiments. In some embodiments, system 100 may be used for 3D image measurements or for other applications. In some embodiments, scanning laser 107 may scan a beam, such as beam 111 across one or more objects. In this illustration, for some embodiments, flat object 110 may be considered to be interposed in the field of view of all the system cameras as well as within the scanning range of the scanning lasers, but multiple objects of various sizes and shapes might be used. At any given time, beam 111 may reflect off a spot, such as spot 112 on the surface of the object. In this example, trajectory 113 representing a path traced out by the beam is shown as a dotted line. Similarly, in some embodiments, another scanning laser, such as scanning laser 109 may be used to scan another beam, such as beam 121 over one or more objects in the scene. Accordingly, in this example, for some embodiments, trajectory 123 traced out by spot 122 may be on the same object (e.g., object 110) as beam 111 simultaneously but may also be scanning other objects or the background of the scene at that time. In this example, for some embodiments, two beams are shown scanning object 110, but in some embodiments more beams could be used without departing from the scope of the innovations disclosed herein. See at least FIG. 9 for a more detailed description of trajectories.

In some embodiments, system 100 may include three cameras as shown here, though two, four, or more could be used. In some embodiments, camera 101, camera 103, or camera 105 may be event cameras, where each pixel in an event camera may independently report changes in light levels at the pixel level. In some embodiments, events reported by such event cameras may be reported in the form (x, y, t), where x and y correspond to the positions of the pixel where the event occurred on the event camera sensor array, and t is the timestamp of the event. In some embodiments, resolution of the camera in time may be constrained by the speed at which the camera can report events in the camera globally as well as effects including time jitter, event timestamp arbiter circuitry, and others. In some embodiments, event cameras may have a time resolution of each event down to 1 μs but may be able to report events even faster as the technology improves. In some embodiments, event cameras may be implemented using CMOS light level changes at each pixel, avalanche photodiode arrays, single photon avalanche diode (SPAD) arrays, or other methods.

Scanning laser beam systems may be particularly advantageous for triggering events at event cameras, since relatively bright reflections from objects may be more likely to be distinguishable from background light or other noise. In some embodiments, since pixels in event cameras may be uncorrelated with each other, each pixel may trigger at the same or similar times as many other pixels on the sensor array of the event camera. In general, event cameras in system 100 may be considered to time synchronized with each other down to the time resolution of the event cameras. In some embodiments, this resolution may be 1 μs or less. Synchronization may be accomplished with signal cables between cameras, or otherwise. In some embodiments, synchronization may be accomplished by calculating the local time at each camera using crossing points of trajectories measured at some or all event cameras substantially simultaneously. In a variant, a time coded signal may be embedded into the scanning laser signal itself. The exact method of synchronization may vary depending on local requirements or local circumstances.

In conventional image analysis using cameras for 3D measurement, positions of cameras and then positions of 3D objects may be ascertained by using point correspondences, where collections of points, lines, or other objects may be extracted from the image scene at each camera. Determination of points to use from each camera perspective may lead to considerable error in the final result calculations, as it may not be often clear how the exact position of each point to be measured may be extracted precisely from each image; moreover, significant errors may result if features measured at each camera may be confused for similar looking features, which may result in one or more point mismatches.

If using system 100 for an application such as 3D measurement of objects, if the position of a point such as point 112 may be measured precisely at a given time in more than one camera, in some embodiments, the position of the point in 3D space may be calculated using triangulation. In some embodiments, errors at a particular point may be less likely, since rather than relying on measuring fiducial points for calculation from the imaged objects directly the position of a beam scanned over the object may be used since the position of the spot measured at any given time may be ascertained more closely on each camera. In some embodiments, this may be simpler if there may be only one beam scanning over the surface of the object. However, two or more beams may be scanned over the object simultaneously to increase the speed of scanning. In some embodiments, increased scanning speed may be needed if higher resolutions scans may be desired or if the object may be moving with respect to the scanning system.

Also, in some cases for some embodiments, if there may be two or more points visible by each camera, there may be ambiguity in the point matching. For example, for some embodiments, it may be possible based on the current location for a point 112 on camera 101 to be incorrectly matched with point 122 on camera 105, leading to an incorrect position of the 3D point calculated of the object. This ambiguity may become more pronounced if there may be more points measured substantially simultaneously. Also, in some embodiments, points or trajectories may be measured using triangulation as described, but in some embodiments, event cameras may have sufficient time resolution to measure time-of-flight (ToF) of returning signals. In specific embodiments, 3-D perception may be obtained from scanning ToF measurements of the beams. In specific embodiments, multiple techniques such as triangulation or ToF may be combined for 3-D perception.

FIG. 1B shows a similar system 130 where the scanning subsystems 131 and 141 each output multiple beams. In this example, one laser beam or possibly multiple laser beams are aimed at scanning mirror 132 and then to a rotating polygonal mirror 134. Accordingly, in some embodiments, three beams, such as beam 135a, beam 135b or beam 135c may scan over object 110 at different locations. Thus, in some embodiments, spots such as spot 136a, spot 136b, spot 136c may trace trajectories such as trajectory 137a, trajectory 137b, or trajectory 137c respectively across the object and scene. Also, in some embodiments, scanning subsystem 141 may similarly scan spots such as spot 146a, spot 146b, or spot 146c along trajectories such as trajectory 147a, trajectory 147b, or trajectory 147c. Accordingly, in some embodiments, with sufficient speed, scanning systems may cover the entire scene with varying trajectories hundreds or thousands of times per second. Note that the scan traces are depicted here as dotted lines for clarity but represent the trajectory of a continuous beam in most cases. For example, beams from scanning lasers may appear as continuous curves on scanned objects while event cameras may be generate discrete events depending on the time resolution of the event cameras.

Figure 2A:
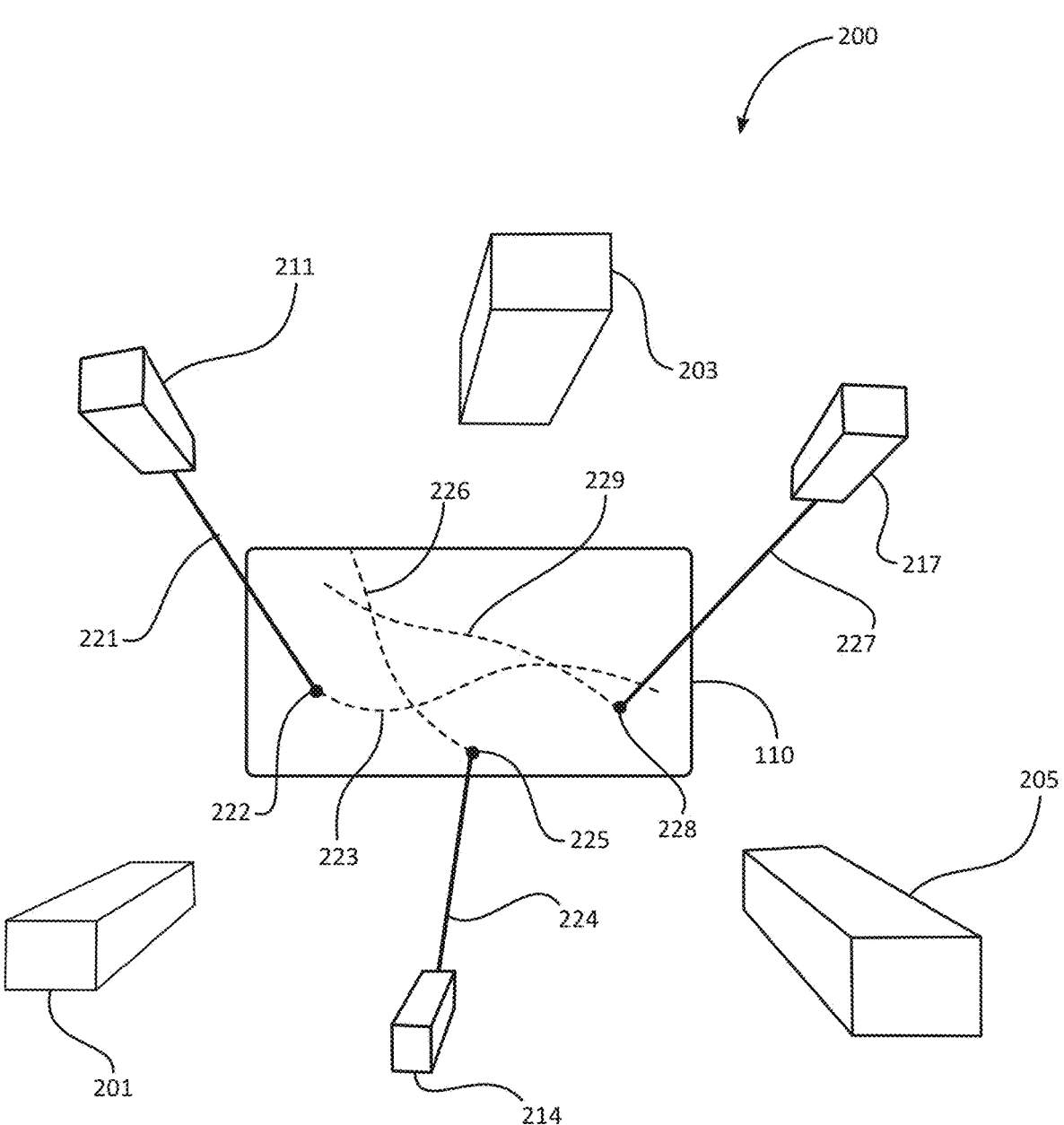
FIG. 2A is a perspective view of a 3-D perception system according to specific embodiments of the invention.

In some embodiments, additional information may be obtained by determining positions and angles from the scanning beams as well as from the cameras. FIG. 1A shows three cameras and two laser beams scanning across a scene. The scanning laser beam projectors as well as the cameras are all in arbitrary locations. Although it may be possible that some of the elements could be lined up such that three or more of the optical centers are collinear, this may not be necessary. In fact, additional disparity between all of the light sources and cameras may be advantageous, as further disparity may improve the determination of 3-D position information because of the different perspectives. For instance, any of the cameras or lasers may be positioned above the scanned objects so that the cameras and lasers may form a ring around the scene, though various configurations may be possible depending on local circumstances. An example of this is illustrated by FIG. 2A, which includes three cameras and three lasers. In this example, for some embodiments, system 200 depicts three cameras (event camera 201, event camera 203, and event camera 205) as well as three laser scanners for scanning the scene scanners (laser scanner 211, laser scanner 214, and laser scanner 217). In this example, for some embodiments, laser scanner 211 generates beam 221 at point 222 on object 110 that has been scanned over path 223. Also, in this example, for some embodiments, laser scanner 214 generates beam 224 at point 225 on object 110 that has been scanned over path 226. Also, in this example, for some embodiments, laser scanner 217 generates beam 227 at point 228 on object 110 that has been scanned over path 229.

Also, in this example, the laser scanner 214 or laser scanner 217 may be considered to be scanning similarly as laser scanner 211.

Figure 2B:
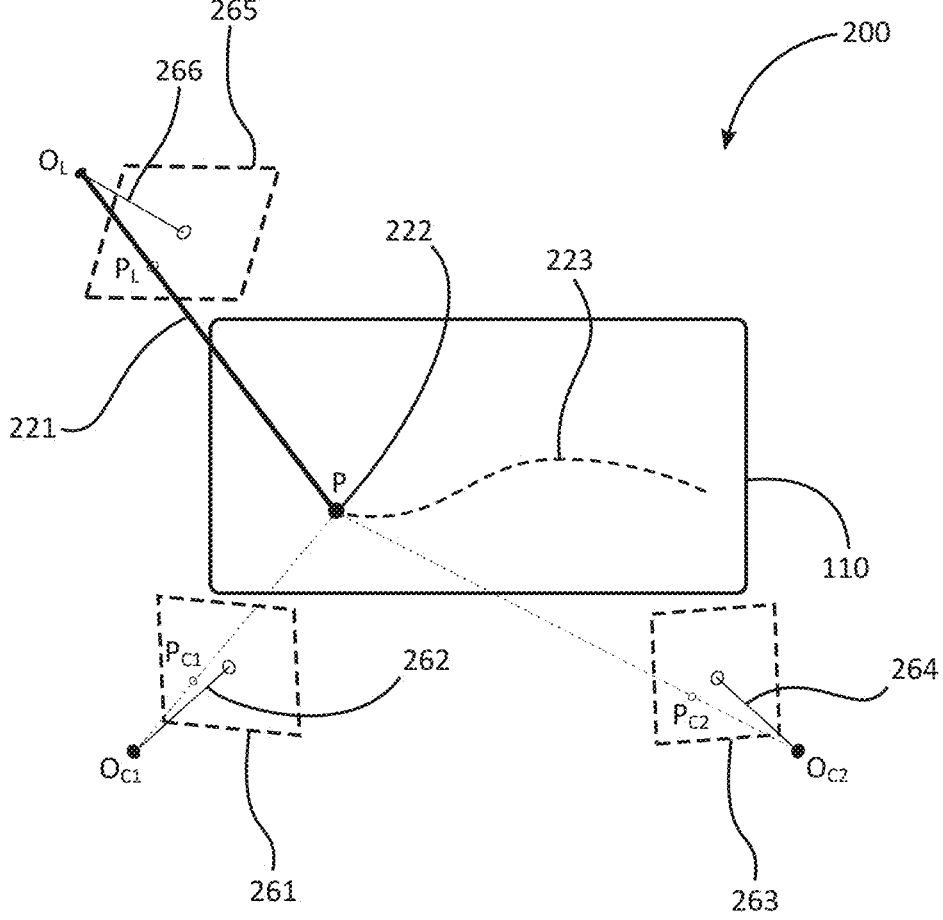
FIG. 2B is a perspective view of diagrammatic view showing parameters of a 3-D perception system according to specific embodiments of the invention.

In some embodiments, scanning lasers such as laser scanner 211 may also be mathematically treated as having a virtual camera associated with such as illustrates by camera 203. Laser 211 may have an optical center from which point the beam may be rotated. That position may be defined as the optical center of the virtual camera. The axis of the laser direction as well as the position of the virtual camera's optical center may be defined by an essential matrix with respect to other physical cameras or virtual cameras in the system using associated epipolar relationships. An illustration of this may be seen in FIG. 2B. Here, system 200 is shown in a simplified format at the same time as in FIG. 2A, where some of the lasers and cameras are not shown. For brevity and clarity, discussion is directed to a single laser point as imaged by two cameras. Laser beam 221 is shown hitting object 110 at point 222, also denoted as point P. The image space of camera 201, also denoted as C1 is shown using its projection plane 261 as well as the optical axis of the camera 262. The axis may be chosen to go through the center of the projected image sensor. All coordinates may be in homogenous coordinate space. Accordingly, in this example, the optical center of C1 is point $O_{C1}$. Point $P_{C1}$ is therefore the image of point P in homogenous image coordinates of camera C1. In a similar manner, the image space of camera 205, or C2 is shown with its projection plane 263 and its optical axis 264, with an optical center point $O_{C2}$ and point $P_{C2}$ is the projection of point P on camera C2. Because the two cameras have been previously calibrated with respect to each other, an epipolar constraint thus holds between them, e.g., $(P_{C1})^T E_{C1C2}(P_{C2})=0$, where $E_{C1C2}$ is the essential matrix between the two cameras C1 and C2.

However, the same relationship may also hold between the laser 211 and each of the other two cameras if the position and rotation of the laser may be known and calibrated with respect to each camera. The virtual camera associated with laser 211, also denoted as L, is shown using its projection plane 265 along with its optical axis 266. Because laser 211 may not be actually imaging, the optical axis may be chosen somewhat arbitrarily. In one embodiment, it may be convenient to measure the full field of view of the scanning laser, and then assign the optical axis to the center of the scanning range, though other axes may be selected possible. The point $P_L$ may be the projection of the laser beam itself through the projection plane 265. If the position of the laser may be well-calibrated, such that both the translation of the optical center $O_L$ may be established accurately with respect to the optical centers of the cameras, and also the rotation of the optical axis 266 of the laser may be known, then the same epipolar relationship applies between the laser and any one of the cameras. For instance, $(P_L)^T E_{LC1}(P_{C1})=0$, where $E_{LC2}$ is the essential matrix between the laser L and camera C1. A key difference here between the laser and the camera may be obtaining point $P_L$ for any measurement. For a camera, this point may directly correspond through a homogenous coordinate transformation to the measurement of the point on each image sensor, but there may be no corresponding measurement of the point directly on the laser. Instead, this point may be inferred indirectly from measured angular positions of the laser. In this case, angular positions may be measured with respect to the laser frame of reference, so the three rotational parameters that may be used to calculate the essential matrix may be relevant; however, if the beam may be substantially circularly symmetric, the degree of freedom of rotation around the optical axis of the laser may be somewhat arbitrary, and may be chosen to match with scanning directions, camera rotation, or other criteria. In this case, the essential matrix may be calculated using the chosen laser optical axis with respect to each camera.

In some embodiments, another difference between the laser and a camera may be the number of effective degrees of freedom. A camera may have six degrees of freedom; three degrees of freedom may be the world coordinates of the optical center of the camera, and three other degrees of freedom may be its rotational degrees of freedom. In some embodiments, a laser scanner may have at least eight degrees of freedom; three degrees of freedom may be the same world coordinates of its optical center, and three degrees of freedom may be the rotational position of the laser scanner housing which may be pointed in various directions or with various orientations, but then two more rotational axes may be normally scanned of the beam or beams from the laser. In some embodiments, if a laser scanner outputs more than one beam, the position of these beams around the optical axis may describe a ninth degree of freedom, though in some cases this may be redundant with roll rotation about the optical axis of the laser system housing. There may be six degrees of freedom of a beam itself, which may exhibit five degrees of freedom if the beam may be circularly symmetric. Thus, the two other rotational degrees of freedom may be additive to one another. Accordingly, in some embodiments, the pitch and yaw axes of the laser may be added to the pitch and yaw induced by aiming the laser housing center toward a given portion of the scene being illuminated.

In some embodiments, the origin of the laser scanners may be determined with respect to the positions of the event cameras without determining the angle. Broadly, this may be done by measuring the positions of the ends of trajectories as they trace over objects that are interposed between the laser scanner at different depths. In some embodiments, multiple line segments created from trajectory ends associated with the objects at different depths may be projected back and intersected to find the laser scanner position. FIG. 4A illustrates a perspective view of a simplified system in accordance with one or more of the various embodiments. View 400 may represent laser scanner 401. Along the optical axis of laser scanner 401 may be placed disc object 403 and background object 405. In this example, disc 403 may be placed approximately centered between laser scanner 401 and background 405. Accordingly, view 410 shows a view from the viewpoint of the laser scanner 401. As usual, several scan paths may be traced on both object 403 and object 405, such as path 411, path 414, and path 417. From this viewpoint, the paths may appear continuous relative to the laser origin because the difference in depths of the scanned objects may not be observable from the point of view of laser scanner 401. However, view 420, which may be considered to have a similar perspective as view 400, may be considered to illustrate the same scanned paths as view 410, with the positions of the path offset based on the disparity in depth positions of disc 403 from background object 405. For example, path 414 starts on the background 405, jumps to disc 403, then goes back to background 405. Though the path, in this example, appears continuous from the viewpoint of the laser, a camera viewing the scene from a different angle may capture the breaks in the scan paths caused by the camera disparity and depth difference in objects as separated captured path trajectories.

Also, view 430 may be considered to show the same elements as view 420 but with some portions removed for clarity. In view 430, since the beam traces over the scene substantially continuously, disparity jumps between objects happen nearly simultaneously. So, if one traced a ray, such as ray 432 from the end of the left portion of path 414 on background 405 through the right side of path 414 on disc 403, this may lead back geometrically to the origin point of the laser scanner, though the origin may not be identified with a single ray. Similarly, one could track ray 434 through the other broken endpoints of path 414. Ray 434 then intersects with ray 432 at the laser origin point. Accordingly, the intersection of at least two rays may be sufficient to locate the laser origin, but in practice, noise and other factors may result two rays that do not exactly intersect, but instead pass near to each other near the true origin. Thus, in some embodiments, to locate the origin of the laser scanner, it may be necessary to average more than two rays from other edge points of scanned objects.

In some embodiments, accuracy in the determination of the laser origin for laser scanner 401 may depend on various factors, including: the number of rays used from other paths; the accuracy of determining trajectory endpoints captured from the same laser scan path; object depth; camera disparity; object disparity; or the like. Most of the views in FIG. 4B correspond to similar views in FIG. 4A. The main difference is that disc object 403 is moved much closer to background object 405 along optical axis 407 of laser 401, as seen in view 440. The paths chosen in view 450 may be the same as those in view 410, however because disc 403 may be farther away from the laser, it may appear smaller compared to background 405, and may have less of the scanned paths reflecting off its surface. Therefore, in view 460, the paths may appear different on disc 403, and there may be less disparity. Similar to view 430, geometric ray 472 and geometric ray 474 may be traced from the disparity gaps at internal endpoints of path 414 (and for other paths as well). These may also meet at the origin point of laser scanner 401 point but may be more sensitive to errors in measurements of the endpoints. Accordingly, under these conditions, the laser origin point may still be located, but it may require more readings to determine the true position.

Note, in some embodiments, actions or operations described above may be performed by one or more of sensing engine 822, modeling engine 824, calibration engine 826, or the like.

FIG. 3 illustrates a flowchart for process 300 for determining a laser scanner position in a 3-D perception system in accordance with one or more of the various embodiments. In some embodiments, actions or operations described for process 300 may be performed by one or more of sensing engine 822, modeling engine 824, calibration engine 826, or the like. In one example, process 300 may be used for system 200 in FIG. 2A but could be used for other configurations as well. In step 310, cameras may be calibrated and synchronized. In specific embodiments, intrinsic calibration of the cameras may be done separately, and then extrinsic calibration (including finding the cameras relative position and rotation) may be done after. In specific embodiments, the system may be calibrated using various scans of one or more beams across a scene, and then calculations (e.g., using bundle adjustment or other methods) can set the calibration. In specific embodiments, intrinsic and extrinsic calibration may be done at the same time. One of ordinary skill in the art will be familiar with various methods of synchronization. Accordingly, for brevity additional calibration discussion is omitted here.

In step 320, an initial set of scans may be taken across the objects in the scene. Accordingly, events may be captured and associated into trajectories. For example, as beam 221 scans across objects in the scene, events may be captured at each of the cameras from light reflected off spot 222 as it traverses the path, insofar as each spot is visible to any particular camera. Events may often in the form of (x,y,t) in the image space of each camera. Events that may be close enough to each other both spatially as well as temporally may be associated into a trajectory on that camera. Path 223 across the object may be captured as trajectories for each of the cameras in the system, in this example event camera 201, event camera 203, and event camera 205. The trajectories may then be fit to time-parameterized functions that allow for subpixel accuracy of the trajectory position as well as having time resolution less than that of the camera. In some cases, for some embodiments, due to occlusion by other objects, non-overlapping field of view (FOV) for each camera, each camera may capture as a trajectory the entire path 223, or they may only capture a portion of path 223, separated into multiple trajectories. However, if there may be portions of the path captured on at least two or more cameras, these may be triangulated or otherwise used in step 330 to find world coordinates of scanned path 223, and thus the surface profiles of objects scanned by the paths may be determined from the trajectories.

In specific embodiments, in step 340, the geometry of the various objects in the scene may be examined to determine how well the laser scanning may work under current conditions. If positions of the objects with respect to each other as well as comparing their positions to the cameras indicate that there may be insufficient disparity among the objects as visible by the camera positions, step 340 may be postponed until conditions may be improved (e.g., objects in the scene or cameras may move into positions that may be more likely to provide results with improved confidence). In the example shown in FIG. 2A, the scene as shown may considered sufficient to calibrate the system and perceive positions and movements of 3-D objects but may not be suitable for step 340 because of the absence of objects at different depths that may enable calibration. Also, in some embodiments, disparity may be important because the laser origin may be determined by creating rays from edges scanned; as mentioned previously, farther distances between those edge points may result in improved accuracy. Note that disparity of objects may be relative depending on the distance from objects to the cameras as well as system parameters such as distance between cameras and the one or more laser scanners. In some embodiments, step 340 may be omitted, using the quality of the data received in other steps to determine confidence of the resulting laser position.

Figure 2C:
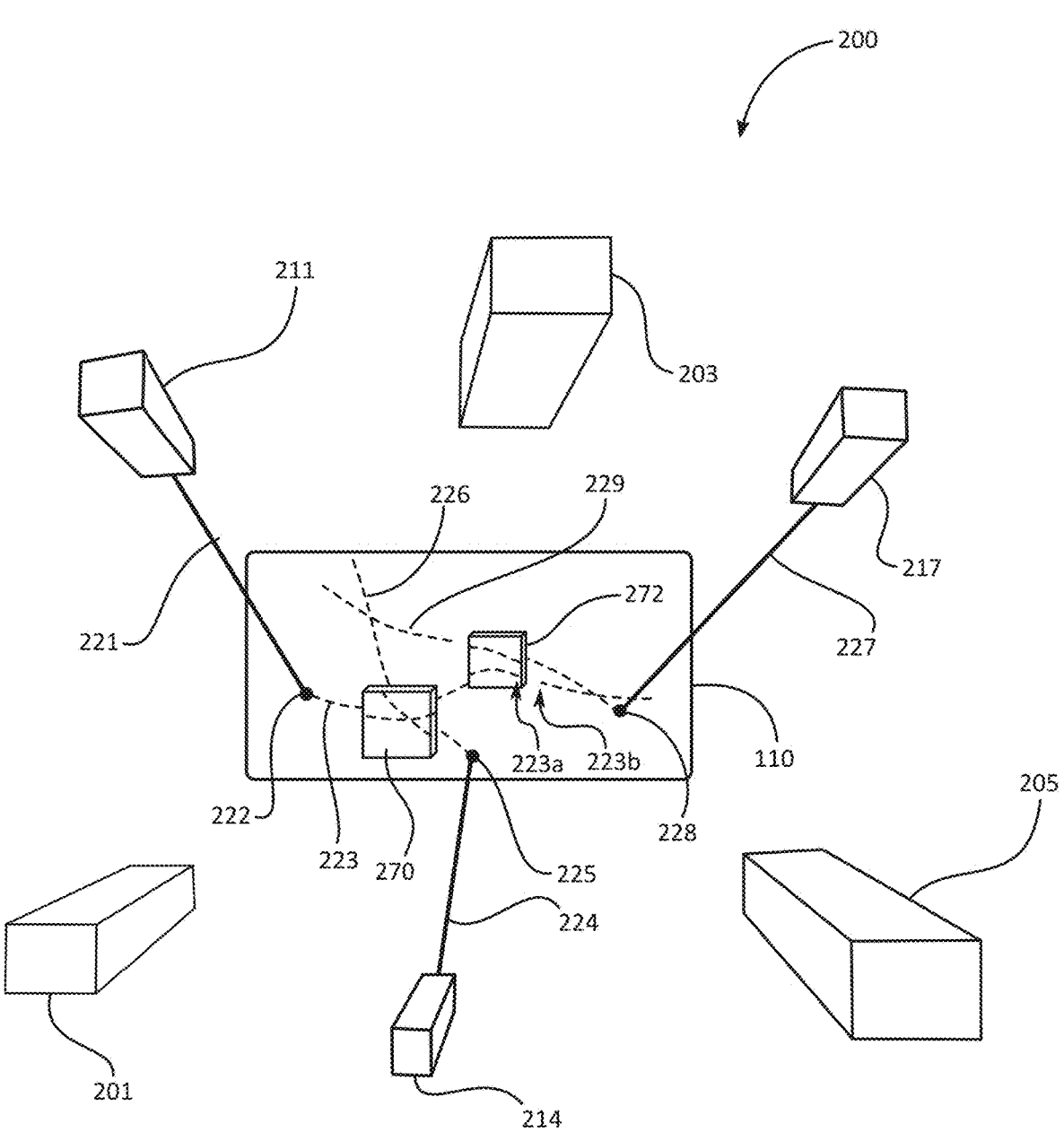
FIG. 2C is similar to FIG. 2A including additional objects in the scene.

FIG. 2C shows system 200 with additional objects, such as object 270 and object 272 in front of background object 110. One or more background objects may be advantageous to increase the amount of data usable for process 300. In some embodiments, process 300 may be accomplished with multiple overlapping objects without the presence of other background objects in the scene. In step 350, the scene may be scanned for an arbitrary amount of time to collect a plurality of scanned trajectories of the scene for processing.

In some embodiments, step 350 may be substantially the same as steps 320 and 330 with scanning performed using different parameters that may improve accuracy. Though the example system shows multiple scanning lasers, for brevity or clarity, process 300 will be described using a single laser (laser 211) with one beam (beam 221) scanning at a time. In this example, for some embodiments, beam 221 scans path 223 in the figure over the scene where spot 222 crosses over object 110, object 272, and object 270. Though single path 223 may be traversed over the scene, multiple distinct trajectories may be captured at various event cameras because of the positional disparity among the objects. Accordingly, the path may appear to have discontinuities or breaks in each camera view as the scan path transitions from the surface of one object to another object. In this example, one discontinuity may be indicated by endpoint 223a and endpoint 223b. In this example, for some embodiments, point 223b shows the end of one trajectory and point 223a shows the beginning of a new trajectory captured as the path traverses object 272 from right to left. Also, path 223 also indicates discontinuities as it crosses between object 110 and object 270.

In step 360, adjacent trajectories with substantially similar timestamps may be found. Of particular use for find these trajectories may be finding edges of trajectories that may be measured from a single pass of the beam over the scene. In some embodiments, a tolerance window may be allowed between the endpoint timestamps. Depending on how each pixel in the event camera may be triggered, there may be some delay from if a pixel may be triggered on the first object scanned relative to the second object scanned. In some cases, timestamps of the two endpoints may be substantially identical, but this may vary depending on a number of factors, including but not limited to albedo of the two objects, sensitivity and other bias settings of each event camera, scanning speed, beam size, or the like. For example, if object 110 reflects more light than object 272, as the beam may be scanned from right to left, the event camera pixel triggered imaging endpoint 223b may trigger several microseconds or more sooner than the event camera pixel triggered for endpoint 223a, which may or may not be within the required tolerance time window. In some cases, time discrepancies may not disqualify endpoints from being used for this step since geometric positions of each endpoint may be a more important metric, yet care must be taken to ensure that the right position is chosen so that the error is not too high. Note that it should also be determined that these trajectories may be determined from events based on reflections from two objects in the scene. In some cases, noise or other factors may cause events to be missed on one or more event cameras along a path of a single object, which may cause the system to create two separate trajectories on the same object. Since the two endpoints would have similar timestamps but be on the same surface, this pair would not be useful for determining beam origin and may be discarded. Another reason to carefully choose tolerance windows in preventing occluded endpoints from being used. With reference to view 450 in FIG. 4B, it may be seen that there may be no occlusion of the beam from the perspective of a scanning laser. A beam moving off one object transitions smoothly to another object nearly continuously. However, this may not be true from a camera viewing the scene. The endpoint of the scanned path on a background object may be blocked from view by one or more cameras. So, if each of endpoint 223*a* or endpoint 223*b* in FIG. 2C cannot be seen by at least two cameras in the system (they may be the same or different cameras), then the world coordinates of the points may not be determined properly. However apparent endpoints may still be visible to the cameras. For example, if the trajectory ending with point 223*b* measured from path 223 toward the right was occluded, point 223*b* as measured may not correspond to the actual endpoint on background object 110 that may be occluded in one or more cameras. This gap between the actual and apparent endpoints may show up as a timestamp discrepancy and may lead to the pair being rejected.

Figure 2D:
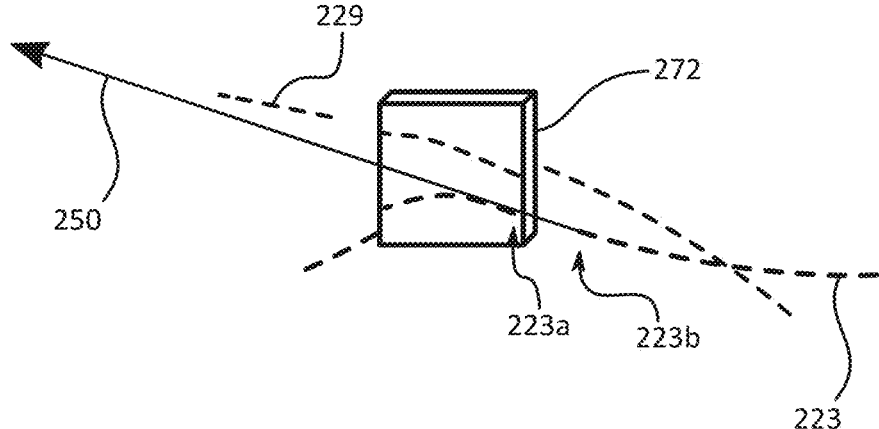
FIG. 2D is a close-up view of FIG. 2C.
Figure 2E:
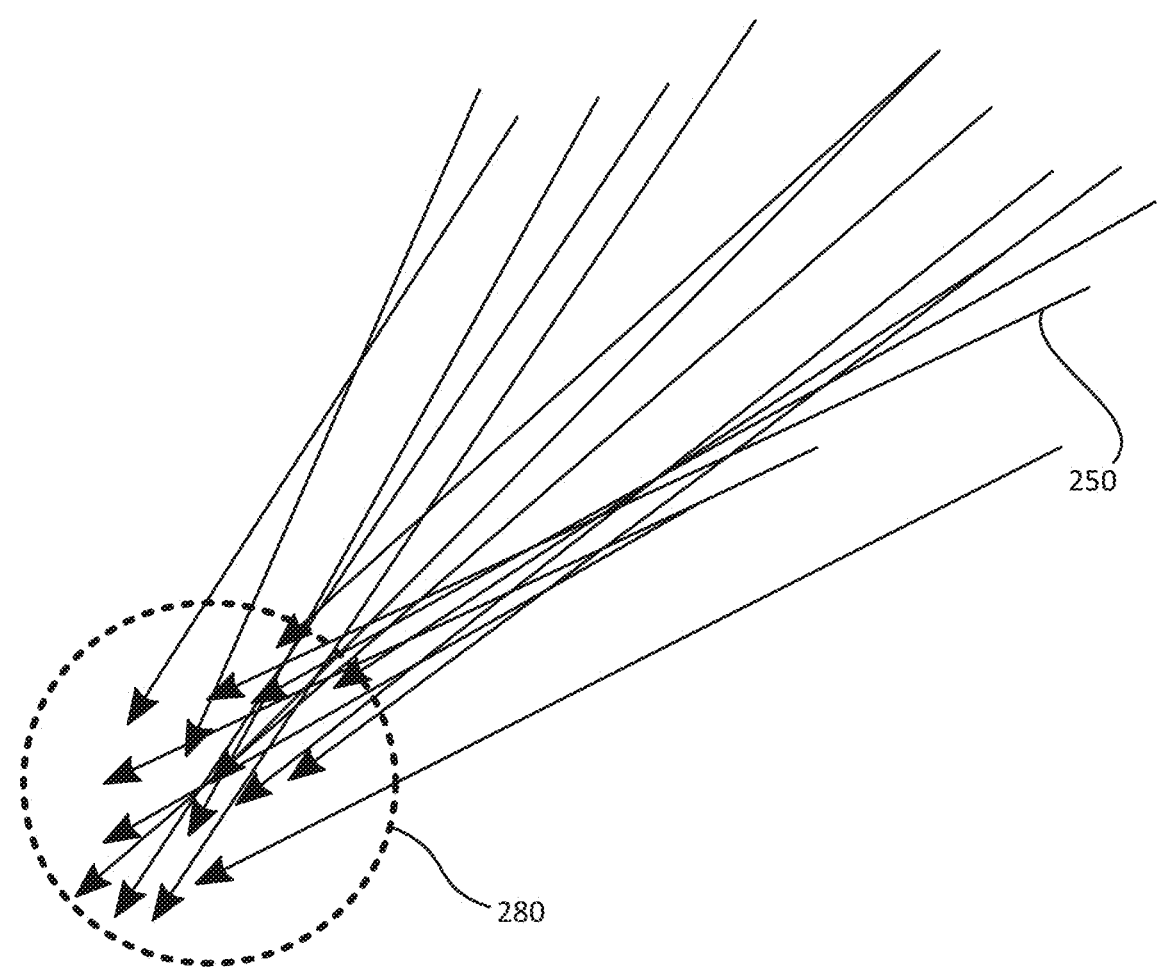
FIG. 2E is a diagram showing an area of geometric ray intersections.

In step 370, trajectories that may be considered adjacent in step 360 may be chosen. For each pair of trajectory endpoints, a geometric ray may be calculated in 3D space. The line segment between the two points may be extended backward toward the laser scanner origin since it traversed that portion of space at nearly the same time. This was already illustrated in reference to FIG. 4A and FIG. 4B. In that example, two rays were shown intersecting at an origin point, but many sets of points may be chosen to create rays. A close-up view of FIG. 2C is shown in FIG. 2D, FIG. 2D shows ray 250 being traced from endpoint 223*a* and endpoint 223*b*. After an arbitrary number of geometric rays have been constructed in a similar fashion, these rays may be treated together as a ray bundle. Though they may be unlikely to intersect precisely at a single point, they may tend to pass through a similar located volume. This is illustrated in FIG. 2E, which only shows geometric rays from a scene. In some embodiments, rays may be constructed at different times from all across the field of view of the system at different times. In some embodiments, rays in the ray bundle may come from a variety of objects around the scene at different depths. In step 380, a ray bundle of likely geometric rays may be assembled into a ray bundle. One of the rays in this example may be ray 250, but many others may be used to find the approximate center. In some cases, several beams may overlap within an uncertainty volume, such as volume 280, within which may be found the true laser origin point. This may be estimated in a variety of ways, but may be found by clustering, by finding the position of nearest proximity of two rays pairwise or may use another statistical approach. The approximate size of the uncertainty volume may be calculated in this step and used to assign a confidence score to the beam position. Confidence scores may be increased if beams converge from many areas of the scene rather than from a smaller portion. If the beam has not yet been located with a sufficient confidence score, the process may iterate back to step 350. Optionally, at this point candidate laser scanner origin points may be tested similarly to the geometry check of step 340 to determine if points used to create the rays may be reasonable; in some cases, the measured likely position may show systematic errors, and tolerance windows may need to be adjusted.

In some embodiments, weighting may be done if creating ray bundles in step 380. Rays created from objects where there may be a greater positional disparity between two objects (and thus trajectory endpoints) generally may have less error in pointing toward the laser origin point than rays created from two objects with less positional disparity. One example mentioned previously include ray 432 and ray 472 from FIG. 4A and FIG. 4B. In this example, ray 432 may be considered to have been created with greater disparity than ray 472, so if both rays were used in calculations of a ray bundle to determine laser origin, ray 432 may be assigned a higher weight than ray 472.

In some embodiments, process 300 may be used to find a laser origin point without regard to the scanning pattern or other properties of the laser. In some embodiments, laser scanning pattern, direction, or velocity may be used to improve endpoint detection in step 360. For example, based on position of trajectories and timestamps, the system may detect the direction that the beam was scanning through the scene. Also, in some embodiments, the scanning velocity, either linear or angular, may be known or measured. In some cases, scanning speed may be slow enough to leave a measurable gap between adjacent pixels triggering even under ideal detection circumstances. Knowledge of these factors may enable the system to correct timing at endpoints of the trajectories to obtain a more accurate version closer to the scanned beam timing on the objects. In addition, beam direction may be associated with geometric rays as they may be created in step 370; this information might be used to correct virtual focusing errors (such as beams converging to a point too close or too far from the actual scanning point due to systematic errors in detecting the timing or position of endpoints across the scene.

Figure 5:
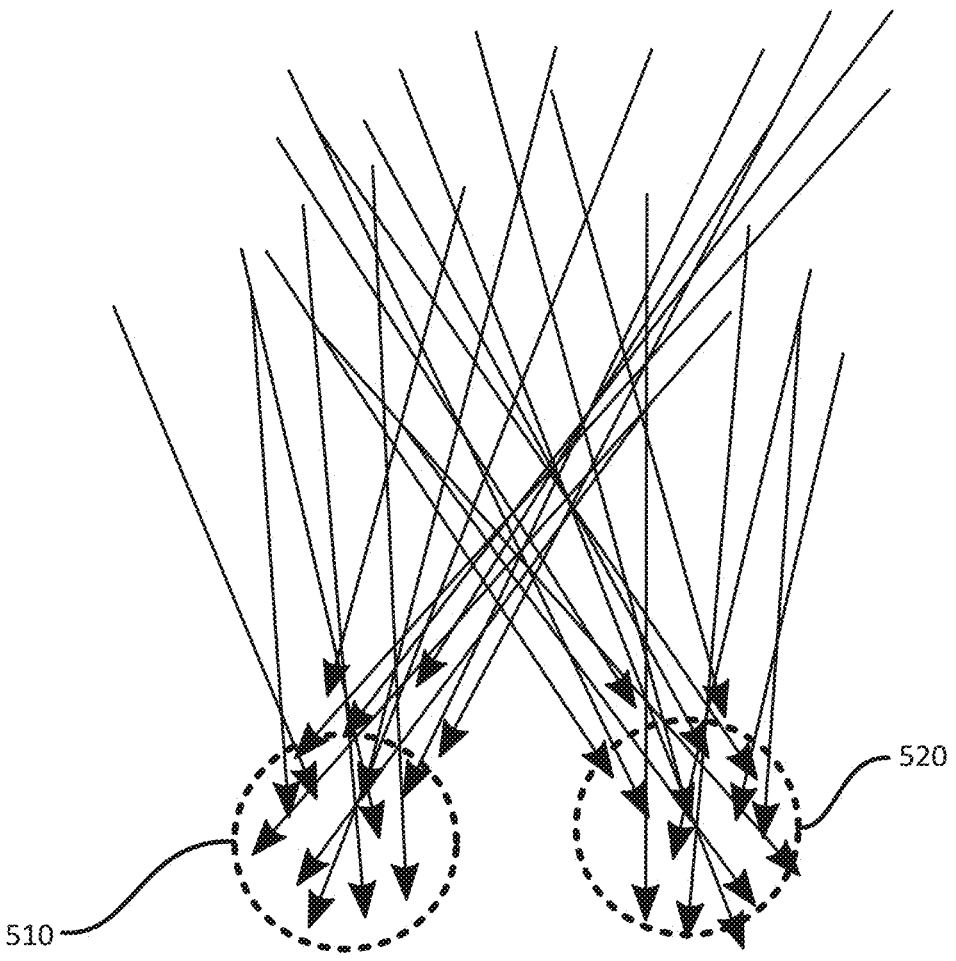
FIG. 5 is a diagram showing areas of multiple geometric ray intersections.

Process 300 was described in reference to a single beam scanning across a scene over time. However, extensions to this may be possible. For instance, FIG. 1B showed a system with two different scanners, each scanner having three beams. The three beams in each scanner may or may not have a common laser origin point. In some embodiments, process 300 may be used to detect multiple origin points. Though this could be done sequentially (e.g., turning on one laser at a time to scan and calculate each origin), in some embodiments this may be done simultaneously. Process 300 could be used with few changes through step 370 including creation of geometric rays. In step 380, fewer assumptions may be made about the nature of the ray bundles. In an example, FIG. 5 shows various geometric rays similar to those in the diagram of FIG. 2E. In this case, the rays tend to intersect in one of two uncertainty volumes, volume 510 or volume 520. These may be clustered separately and then using methods similar to those described earlier, the two origin points may be found. This process may be done absent a priori knowledge of how many lasers may be scanning the scene, though this information may be known ahead of time. Nevertheless, it may still be useful to make the assumption that the number of lasers may be unknown. In some cases, objects may be positioned during the scans such that one of the lasers may not overlap objects in the scene, or else may be positioned such that few usable endpoints may be determined adjacent in step 360. In this case, some of the laser origin points may still be detected.

If detecting multiple laser origin points simultaneously, other errors, such as timestamp intersections, may occur that may be accounted for. In one example, it may possible that two beams scanning either near or far from each other in the scene may intersect the edge of an object at substantially the same time and create a matched pair of trajectory endpoints suitable for creating a geometric ray. In some cases, there may be actually two matched pairs created, but it may be difficult to determine which point on a background object should be matched with a corresponding foreground object point. Though complicated heuristics may be used to determine these intersections, innovations disclosed herein may be advantageous. In some embodiments, one or more intersections may be discarded as usable endpoints. In another embodiment, geometric rays may be created from the intersection endpoints. In the abstract, if foreground points F1 and F2 were detected along with background points B1 and B2, then two sets of rays may be created in step 370 from these points. One set (the correct ones) may pass through B1 and F1 toward a first laser origin with another ray passing through B2 and F2 toward the second laser origin. However, the other rays through pairs (B1, F2) and (B2, F1) may be created and added to the ray bundles. In later applied clustering algorithms, the incorrect rays may diverge from uncertainty spheres that correspond to laser origins and may be discarded at that step.

In some embodiments, intersections may also be detected and removed when scanning lasers with multiple beams such as beam 135a, beam 135b, beam 135c in FIG. 1B. Since the movement of a set of beams like these may likely be correlated, it may be more common to see timestamp intersections, possibly even from the same object being scanned. However, the process to remove these intersections may be similar to that described earlier, where all pairs of possible rays may be created. In the case of multiple beams with a single origin point, divergent rays could be more easily detected.

Illustrated Operating Environment

Figure 6:
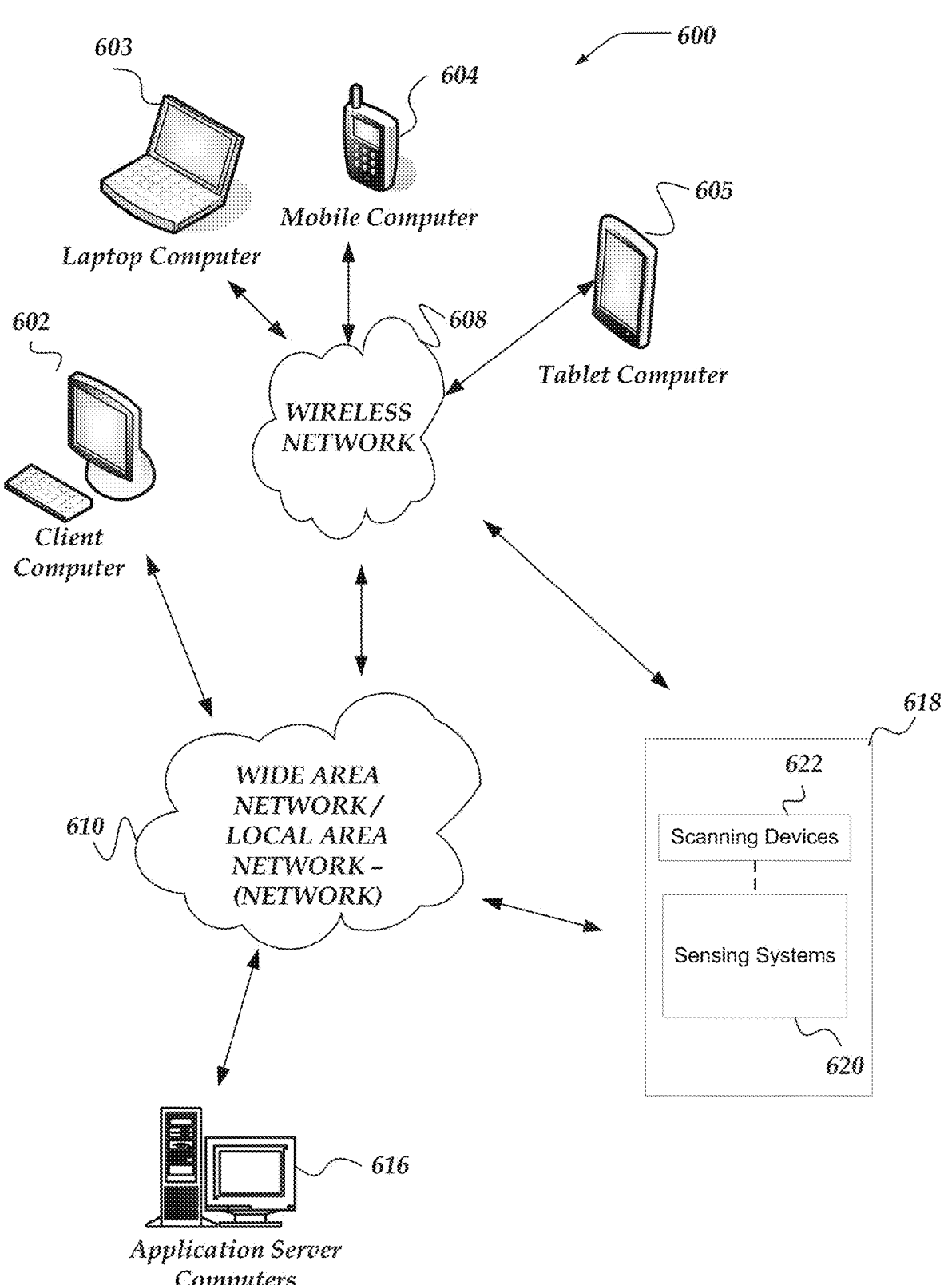
FIG. 6 shows components of one embodiment of an environment in which embodiments of the innovations may be practiced.

FIG. 6 shows components of one embodiment of an environment in which embodiments of the innovations may be practiced. Not all of the components may be required to practice the innovations, and variations in the arrangement and type of the components may be made without departing from the spirit or scope of the innovations. As shown, system 600 of FIG. 6 includes local area networks (LANs)/wide area networks (WANs), such as, network 610, wireless network 608, client computers 602-605, application server computer 616, scanning systems 618, or the like. In some embodiments, scanning systems 618 may include one or more of sensing systems 620, scanning devices 622, or the like.

At least one embodiment of client computers 602-605 is [described in more detail below in conjunction with FIG. 8. In one or more embodiments, at least some of client computers 602-605 may operate over one or more wired or wireless networks, such as networks 608, or 610. Generally, client computers 602-605 may include virtually any computer capable of communicating over a network to send and receive information, perform various online activities, offline actions, or the like. In one embodiment, one or more of client computers 602-605 may be configured to operate within a business or other entity to perform a variety of services for the business or other entity. For example, client computers 602-605 may be configured to operate as a web server, firewall, client application, media player, mobile telephone, game console, desktop computer, or the like. However, client computers 602-605 are not constrained to these services and may also be employed, for example, as for end-user computing in other embodiments. It should be recognized that more or less client computers (as shown in FIG. 6) may be included within a system such as described herein, and embodiments are therefore not constrained by the number or type of client computers employed.

Computers that may operate as client computer 602 may include computers that typically connect using a wired or wireless communications medium such as personal computers, multiprocessor systems, microprocessor-based or programmable electronic devices, network PCs, or the like. In some embodiments, client computers 602-605 may include virtually any portable computer capable of connecting to another computer and receiving information such as, laptop computer 603, mobile computer 604, tablet computers 605, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 602-605 typically range widely in terms of capabilities and features. Moreover, client computers 602-605 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one or more embodiments, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one or more embodiments, a user of the client computer may employ the browser application to perform various activities over a network (online). However, another application may also be used to perform various online activities.

Client computers 602-605 also may include at least one other client application that is configured to receive or send content between another computer. The client application may include a capability to send or receive content, or the like. The client application may further provide information that identifies itself, including a type, capability, name, and the like. In one or more embodiments, client computers 602-605 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 616, scanning systems 618, sensing systems 620, scanning devices 622, or other computers.

Client computers 602-605 may further be configured to include a client application that enables an end-user to log into an end-user account that may be managed by another computer, such as application server computer 616, scanning systems 618, sensing systems 620, scanning devices 622, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 620 or scanning devices 622.

Wireless network 608 is configured to couple client computers 603-605 and its components with network 610. Wireless network 608 may include any of a variety of wireless sub-networks that may further overlay stand-alone ad-hoc networks, and the like, to provide an infrastructure-oriented connection for client computers 603-605. Such sub-networks may include mesh networks, Wireless LAN (WLAN) networks, cellular networks, and the like. In one or more embodiments, the system may include more than one wireless network.

Wireless network 608 may further include an autonomous system of terminals, gateways, routers, and the like connected by wireless radio links, and the like. These connectors may be configured to move freely and randomly and organize themselves arbitrarily, such that the topology of wireless network 608 may change rapidly.

Wireless network 608 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 603-605 with various degrees of mobility. In one non-limiting example, wireless network 608 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 608 may include virtually any wireless communication mechanism by which information may travel between client computers 603-605 and another computer, network, a cloud-based network, a cloud instance, or the like.

Network 610 is configured to couple network computers with other computers, including, application server computer 616, scanning systems 618, sensing systems 620, scanning devices 622, client computers 602, and client computers 603-605 through wireless network 608, or the like. Network 610 is enabled to employ any form of computer readable media for communicating information from one electronic device to another. Also, network 610 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices may be remotely connected to either LANs or WANs via a modem and temporary telephone link. In one or more embodiments, network 610 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 616, scanning systems 618 or scanning devices 620 are described in more detail below in conjunction with FIG. 7 or FIG. 8. Although FIG. 6 illustrates application server computer 616, sensing systems 620, and scanning devices 622 each as a single computer, the innovations or embodiments are not so limited. For example, one or more functions of application server computer 616, sensing systems 620, scanning devices 622, or the like, may be distributed across one or more distinct network computers, camera boxes, systems, or client computers. Moreover, in one or more embodiments, sensing systems 620 may be implemented using a plurality of network computers. Further, in one or more of the various embodiments, application server computer 616, sensing systems 620, or the like, may be implemented using one or more cloud instances in one or more cloud networks. Also, in some embodiments, application server computer 616, sensing systems 620, and scanning devices 622, or the like. Accordingly, these innovations and embodiments are not to be construed as being limited to a single environment, and other configurations, and other architectures are also envisaged.

Illustrative Client Computer

Figure 7:
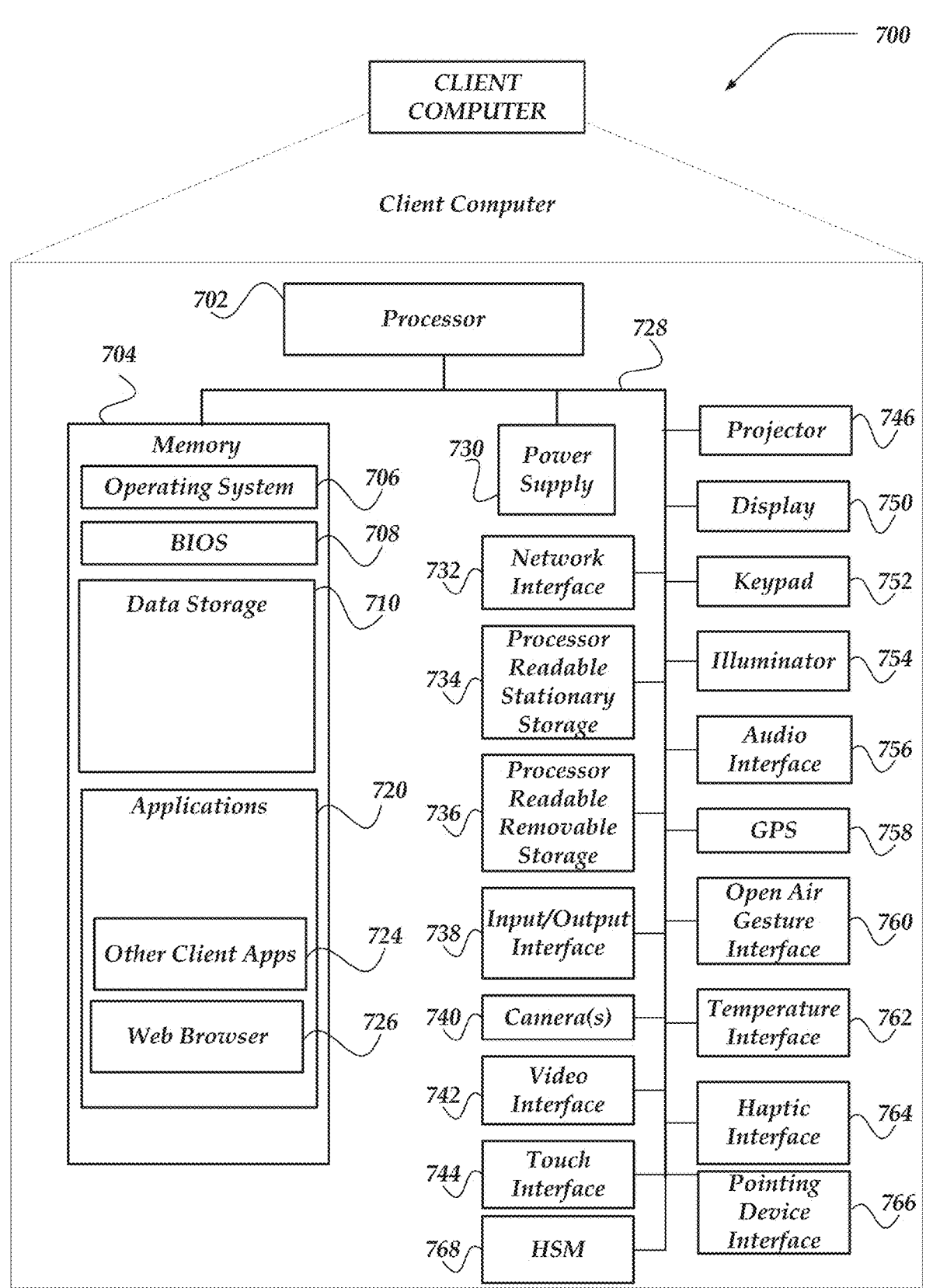
FIG. 7 shows one embodiment of a client computer that may include many more or less components than those shown.

FIG. 7 shows one embodiment of client computer 700 that may include many more or less components than those shown. Client computer 700 may represent, for example, one or more embodiments of mobile computers or client computers shown in FIG. 6. Further, scanning devices, mobile phones, scanning devices, or the like, discussed above may be considered client computers that may be arranged in configurations or form factors as described above. In some embodiments, some or all components of client computers, such as client computer 700 may be embedded or included in a vision system.

Client computer 700 may include processor 702 in communication with memory 704 via bus 728. Client computer 700 may also include power supply 730, network interface 732, audio interface 756, display 750, keypad 752, illuminator 754, video interface 742, input/output interface 738, haptic interface 764, global positioning systems (GPS) receiver 758, open air gesture interface 760, temperature interface 762, camera(s) 740, projector 746, pointing device interface 766, processor-readable stationary storage device 734, and processor-readable removable storage device 736. Client computer 700 may optionally communicate with a base station (not shown), or directly with another computer. And in one or more embodiments, although not shown, a gyroscope may be employed within client computer 700 to measuring or maintaining an orientation of client computer 700.

Power supply 730 may provide power to client computer 700. A rechargeable or non-rechargeable battery may be used to provide power. The power may also be provided by an external power source, such as an AC adapter or a powered docking cradle that supplements or recharges the battery.

Network interface 732 includes circuitry for coupling client computer 700 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 732 is sometimes known as a transceiver, transceiving device, or network interface card (NIC).

Audio interface 756 may be arranged to produce and receive audio signals such as the sound of a human voice. For example, audio interface 756 may be coupled to a speaker and microphone (not shown) to enable telecommunication with others or generate an audio acknowledgement for some action. A microphone in audio interface 756 can also be used for input to or control of client computer 700, e.g., using voice recognition, detecting touch based on sound, and the like.

Display 750 may be a liquid crystal display (LCD), gas plasma, electronic ink, light emitting diode (LED), Organic LED (OLED) or any other type of light reflective or light transmissive display that may be used with a computer. Display 750 may also include a touch interface 744 arranged to receive input from an object such as a stylus or a digit from a human hand, and may use resistive, capacitive, surface acoustic wave (SAW), infrared, radar, or other technologies to sense touch or gestures.

Projector 746 may be a remote handheld projector or an integrated projector that is capable of projecting an image on a remote wall or any other reflective object such as a remote screen.

Also, in some embodiments, if client computer 200 may be a scanning device, projector 746 may include one or more signal beam generators, laser scanner systems, or the like, that may be employed for scanning scene or objects as described above.

Video interface 742 may be arranged to capture video images, such as a still photo, a video segment, an infrared video, or the like. For example, video interface 742 may be coupled to a digital video camera, a web-camera, or the like. Video interface 742 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 752 may comprise any input device arranged to receive input from a user. For example, keypad 752 may include a push button numeric dial, or a keyboard. Keypad 752 may also include command buttons that are associated with selecting and sending images.

Illuminator 754 may provide a status indication or provide light. Illuminator 754 may remain active for specific periods of time or in response to event messages. For example, if illuminator 754 is active, it may backlight the buttons on keypad 752 and stay on while the client computer is powered. Also, illuminator 754 may backlight these buttons in various patterns if particular actions are performed, such as dialing another client computer. Illuminator 754 may also cause light sources positioned within a transparent or translucent case of the client computer to illuminate in response to actions.

Further, client computer 700 may also comprise hardware security module (HSM) 768 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 768 may be a stand-alone computer, in other cases, HSM 768 may be arranged as a hardware card that may be added to a client computer.

Client computer 700 may also comprise input/output interface 738 for communicating with external peripheral devices or other computers such as other client computers and network computers. The peripheral devices may include an audio headset, virtual reality headsets, display screen glasses, remote speaker system, remote speaker and microphone system, and the like. Input/output interface 738 can utilize one or more technologies, such as Universal Serial Bus (USB), Infrared, WiFi, WiMax, Bluetooth™, and the like.

Input/output interface 738 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to client computer 700.

Haptic interface 764 may be arranged to provide tactile feedback to a user of the client computer. For example, the haptic interface 764 may be employed to vibrate client computer 700 in a particular way if another user of a computer is calling. Temperature interface 762 may be used to provide a temperature measurement input or a temperature changing output to a user of client computer 700. Open air gesture interface 760 may sense physical gestures of a user of client computer 700, for example, by using single or stereo video cameras, radar, a gyroscopic sensor inside a computer held or worn by the user, or the like. Camera 740 may be used to track physical eye movements of a user of client computer 700.

Further, in some cases, if client computer 700 may be a scanning device, camera 740 may represent one or more event cameras, one or more frame cameras, or the like.

GPS transceiver 758 can determine the physical coordinates of client computer 700 on the surface of the Earth, which typically outputs a location as latitude and longitude values. GPS transceiver 758 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 700 on the surface of the Earth. It is understood that under different conditions, GPS transceiver 758 can determine a physical location for client computer 700. In one or more embodiment, however, client computer 700 may, through other components, provide other information that may be employed to determine a physical location of the client computer, including for example, a Media Access Control (MAC) address, IP address, and the like.

In at least one of the various embodiments, applications, such as, operating system 706, other client apps 724, web browser 726, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 758. Also, in some embodiments, geolocation information may include information provided using one or more geolocation protocols over the networks, such as, wireless network 708 or network 711.

Human interface components may be peripheral devices that are physically separate from client computer 700, allowing for remote input or output to client computer 700. For example, information routed as described here through human interface components such as display 750 or keyboard 752 can instead be routed through network interface 732 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which may include a remote pico projector along with one or more cameras that remotely communicate with a separately located client computer to sense a user's gestures toward portions of an image projected by the pico projector onto a reflected surface such as a wall or the user's hand.

A client computer may include web browser application 726 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 704 may include RAM, ROM, or other types of memory. Memory 704 illustrates an example of computer-readable storage media (devices) for storage of information such as computer-readable instructions, data structures, program modules or other data. Memory 704 may store BIOS 708 for controlling low-level operation of client computer 700. The memory may also store operating system 706 for controlling the operation of client computer 700. It may be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 704 may further include one or more data storage 710, which can be utilized by client computer 700 to store, among other things, applications 720 or other data. For example, data storage 710 may also be employed to store information that describes various capabilities of client computer 700. The information may then be provided to another device or computer based on any of a variety of methods, including being sent as part of a header during a communication, sent upon request, or the like. Data storage 710 may also be employed to store social networking information including address books, buddy lists, aliases, user profile information, or the like. Data storage 710 may further include program code, data, algorithms, and the like, for use by a processor, such as processor 702 to execute and perform actions. In one embodiment, at least some of data storage 710 may also be stored on another component of client computer 700, including, but not limited to, non-transitory processor-readable removable storage device 736, processor-readable stationary storage device 734, or even external to the client computer.

Applications 720 may include computer executable instructions which, if executed by client computer 700, transmit, receive, or otherwise process instructions and data. Applications 720 may include, for example, other client applications 724, web browser 726, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 700 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 700 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 8:
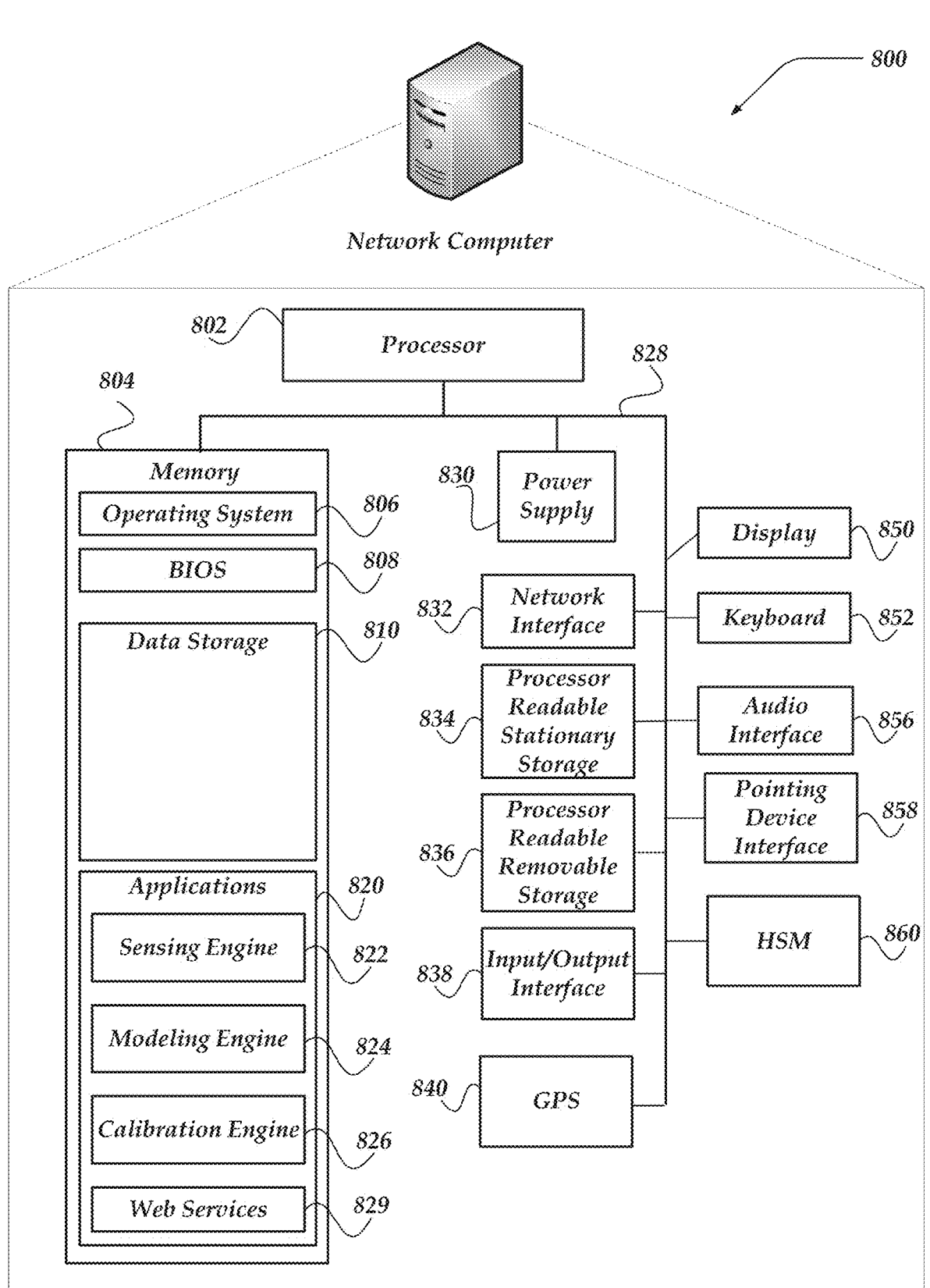
FIG. 8 shows one embodiment of a network computer that may be included in a system implementing one or more of the various embodiments.

FIG. 8 shows one embodiment of network computer 800 that may be included in a system implementing one or more of the various embodiments. Network computer 800 may include many more or less components than those shown in FIG. 8. However, the components shown are sufficient to disclose an illustrative embodiment for practicing these innovations. Network computer 800 may represent, for example, one embodiment of at least one of application server computer 616, or sensing systems 620 of FIG. 6.

In one or more of the various embodiments, scanning devices, sensing systems, mobile computers, or mobile phones may be arranged to communicate with one or more network computers, such as, network computer 800. In some embodiments, network computers may provide: software/firmware updates; backup storage; communication between or among scanning devices, mobile computers; or the like. In some cases, network computer 800 may be considered part of a cloud-based system that provides computational support for scanning devices, sensing systems, or the like.

Network computers, such as, network computer 800 may include a processor 802 that may be in communication with a memory 804 via a bus 828. In some embodiments, processor 802 may be comprised of one or more hardware processors, or one or more processor cores. In some cases, one or more of the one or more processors may be specialized processors designed to perform one or more specialized actions, such as, those described herein. Network computer 800 also includes a power supply 830, network interface 832, audio interface 856, display 850, keyboard 852, input/output interface 838, processor-readable stationary storage device 834, and processor-readable removable storage device 836. Power supply 830 provides power to network computer 800.

Network interface 832 includes circuitry for coupling network computer 800 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 832 is sometimes known as a transceiver, transceiving device, or network interface card (NIC). Network computer 800 may optionally communicate with a base station (not shown), or directly with another computer.

Audio interface 856 is arranged to produce and receive audio signals such as the sound of a human voice. For example, audio interface 856 may be coupled to a speaker and microphone (not shown) to enable telecommunication with others or generate an audio acknowledgement for some action. A microphone in audio interface 856 can also be used for input to or control of network computer 800, for example, using voice recognition.

Display 850 may be a liquid crystal display (LCD), gas plasma, electronic ink, light emitting diode (LED), Organic LED (OLED) or any other type of light reflective or light transmissive display that may be used with a computer. In some embodiments, display 850 may be a handheld projector or pico projector capable of projecting an image on a wall or other object.

Network computer 800 may also comprise input/output interface 838 for communicating with external devices or computers not shown in FIG. 8. Input/output interface 838 can utilize one or more wired or wireless communication technologies, such as USB™, Firewire™, WiFi, WiMax, Thunderbolt™, Infrared, Bluetooth™, Zigbee™, serial port, parallel port, and the like. Also, input/output interface 838 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or capture data that is external to network computer 800. Human interface components may be physically separate from network computer 800, allowing for remote input or output to network computer 800. For example, information routed as described here through human interface components such as display 850 or keyboard 852 can instead be routed through the network interface 832 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 858 to receive user input.

GPS transceiver 840 can determine the physical coordinates of network computer 800 on the surface of the Earth, which typically outputs a location as latitude and longitude values. GPS transceiver 840 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 800 on the surface of the Earth. It is understood that under different conditions, GPS transceiver 840 can determine a physical location for network computer 800. In one or more embodiments, however, network computer 800 may, through other components, provide other information that may be employed to determine a physical location of the client computer, including for example, a Media Access Control (MAC) address, IP address, and the like.

In at least one of the various embodiments, applications, such as, operating system 806, sensing engine 822, modeling engine 824, calibration engine 826, web services 829, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 840. Also, in some embodiments, geolocation information may include information provided using one or more geolocation protocols over the networks, such as, wireless network 508 or network 510.

Memory 804 may include Random Access Memory (RAM), Read-Only Memory (ROM), or other types of memory. Memory 804 illustrates an example of computer-readable storage media (devices) for storage of information such as computer-readable instructions, data structures, program modules or other data. Memory 804 stores a basic input/output system (BIOS) 808 for controlling low-level operation of network computer 800. The memory also stores an operating system 806 for controlling the operation of network computer 800. It may be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 804 may further include one or more data storage 810, which can be utilized by network computer 800 to store, among other things, applications 820 or other data. For example, data storage 810 may also be employed to store information that describes various capabilities of network computer 800. The information may then be provided to another device or computer based on any of a variety of methods, including being sent as part of a header during a communication, sent upon request, or the like. Data storage 810 may also be employed to store social networking information including address books, buddy lists, aliases, user profile information, or the like. Data storage 810 may further include program code, data, algorithms, and the like, for use by a processor, such as processor 802 to execute and perform actions such as those actions described below. in one or more embodiments, at least some of data storage 810 may also be stored on another component of network computer 800, including, but not limited to, non-transitory media inside processor-readable removable storage device 836, processor-readable stationary storage device 834, or any other computer-readable storage device within network computer 800, or even external to network computer 800.

Applications 820 may include computer executable instructions which, if executed by network computer 800, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 820 may include sensing engine 822, modeling engine 824, calibration engine 826, web services 829, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 822, modeling engine 824, calibration engine 826, web services 829, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 822, modeling engine 824, calibration engine 826, web services 829, or the like, may be provisioned and de-commissioned automatically.

Also, in one or more of the various embodiments, sensing engine 822, modeling engine 824, calibration engine 826, web services 829, or the like, may be located in virtual servers running in a cloud-based computing environment rather than being tied to one or more specific physical network computers.

Further, network computer 800 may also comprise hardware security module (HSM) 860 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 860 may be a stand-alone network computer, in other cases, HSM 860 may be arranged as a hardware card that may be installed in a network computer.

Additionally, in one or more embodiments (not shown in the figures), network computer 800 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

FIG. 9 illustrates a logical representation of sensors and sensor output information for perceiving scene features using event sensors and image sensors in accordance with one or more of the various embodiments.

In one or more of the various embodiments, sensing systems, such as multi-camera system 100 (See, FIG. 1) may be provided sensor output from various sensors. In this example, for some embodiments, sensor 902A may be considered to represent a generic sensor that may emit signals that correspond to the precise location on the sensor where reflected energy from the scanning signal generator may be detected. For example, sensor 902A may be considered an array of detector cells that reports the cell location of the cell that has detected energy reflected from the scanning signal generator. In this example, horizontal location 904 and vertical location 906 may be considered to represent a location corresponding to the location in sensor 902 where reflected signal energy has been detected. Accordingly, sensor 902 may be considered a sensor that may be part of an event camera that may be included in a multi-camera sensing system, such as, system 100, or the like, where the signal energy may be provided scanning lasers and the reflect signal energy may be considered the laser light that may be reflected from one or more objects or surfaces in the scene.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employ triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a known precise path/curve (e.g., scanning path). Accordingly, in some embodiments, the pattern or sequence of cells in the sensors that detect reflected energy may follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 908 may represent a sequence of cells in sensor 902B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to if the detection event occurred.

In this example, for some embodiments, data structure 910 may be considered a data structure for representing sensor events based on sensor output provided to a sensing engine. In this example, column 912 represents the horizontal position of the location in the scanning environment, column 914 represents a vertical position in the scanning environment, and column 916 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor events as noise if their location deviates from a predicted path beyond a defined threshold value.

In one or more of the various embodiments, sensing engines may be arranged to determine sensor events for each individual sensor rather than being limited to provide sensor events computed based on outputs from multiple sensors. For example, in some embodiments, sensing engines may be arranged to provide a data structure similar to data structure 910 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 918 to represent a trajectory that may be determined based on the information captured by the sensors. In this example, data structure 910 may be table-like structure that includes columns, such as, column 920 for storing a first x-position, column 922 for storing a second x-position, column 924 for storing a first y-position, column 926 for storing a second y-position, column 928 for storing the beginning time of a trajectory, column 930 for storing an end time of a trajectory, of the like.

In this example, row 932 represents information for a first trajectory and row 934 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements.

Further, one of ordinary skill in the art will appreciate that in some embodiments, trajectories may be projected/converted into 3-D scene coordinates based on calibration information, such as, the position or orientation of sensors, signal generators (e.g., scanning lasers), or the like.

In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may spread to adjacent cells, traverse adjacent cells, or land on the border of two or more adjacent cells. Accordingly, in some embodiments, to better estimate the real position of the reflected signal beam as it traverses the sensor plane, sensing engines may be arranged to perform an online smoothing estimate, e.g., using a Kalman filter to predict a position in a trajectory in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to if the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 918 for each sensor. Thus, the relative position information for different sensors or different collections of the data may be used to compute 3-D coordinates for events or trajectories.

FIG. 10 illustrates a logical schematic of system 1000 for perceiving scene features using event sensors and image sensors in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 1002 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 1004.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines associated with sensing engines or scanning devices may be arranged to employ rules, instructions, heuristics, or the like, for classifying sensor events as noise that may be provided via configuration information to account for local requirements or local circumstances that may be associated with a sensing applications or sensors.

Figure 11:
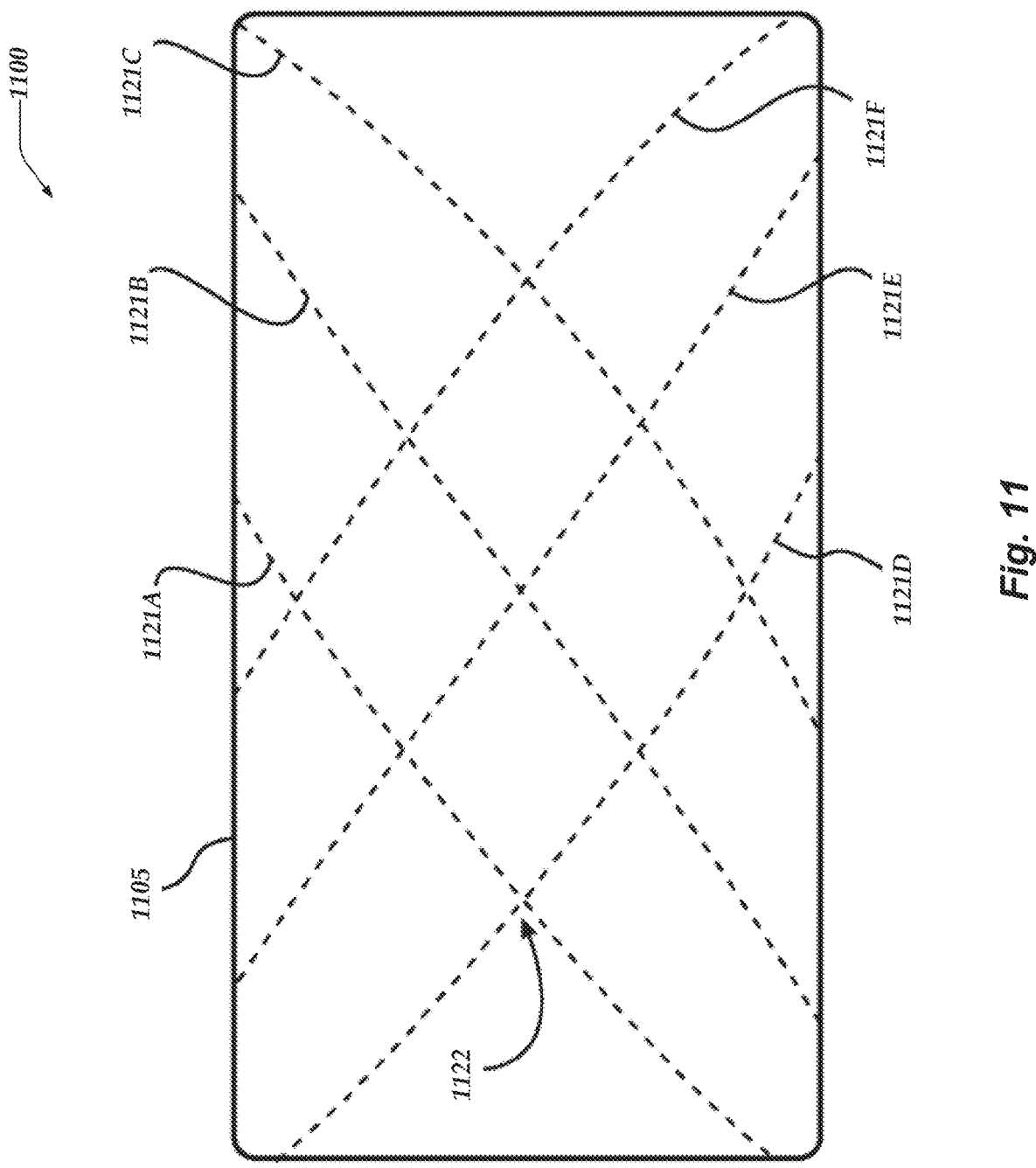
FIG. 11 illustrates how paths associated with scanned beams may traverse over or across a scene.

FIG. 11 illustrates how paths associated with scanned beams may traverse over or across a scene. In this example, scene 1105 represents a scanned surface or area displaying paths 1121A, 1121B, 1121C, 1121D, 1121E, and 1121F, which comprise a subset of the paths on the surface of scene 1105 in accordance with one or more of the various embodiments. A continuous portion of the path may be defined relative to parameters set on event sensors; although continuous paths may be defined in many ways, one way may be that neighboring or near events on a contiguous path as detected by an event sensor may be less than an arbitrary distance away from the preceding event on the path both spatially as well as in time, and generally may be produced by tracing a path on an object over a surface without significant discontinuities. In some embodiments, sensing systems may be arranged to employ rules, instructions, or the like, for determining trajectories or paths from events that may be provided via configuration information to account for local requirements or local circumstances.

In this example, crossing point 1122 may be representative of many crossing points that may occur during the scanning of an object or scene, and may be a point used as an artificial fiducial point. Though not all crossing points in FIG. 11 may be labeled as such, crossing points may be referred to by the paths which cross. For instance, point 1122 may also be named crossing point 1121AD, as this may be the crossing point of the paths 1121A and 1121D. Other crossing points may be referred to in a similar manner. For clarity, paths 1121A-F as shown may be representative of the path of a signal generator beam as it intersects the surface of an object or scene. Accordingly, events as captured on sensors may determine these paths, but may be detected as tilted or skewed differently, since the paths as seen on each sensor may be from the perspective of the sensor in its position.

Figure 12:
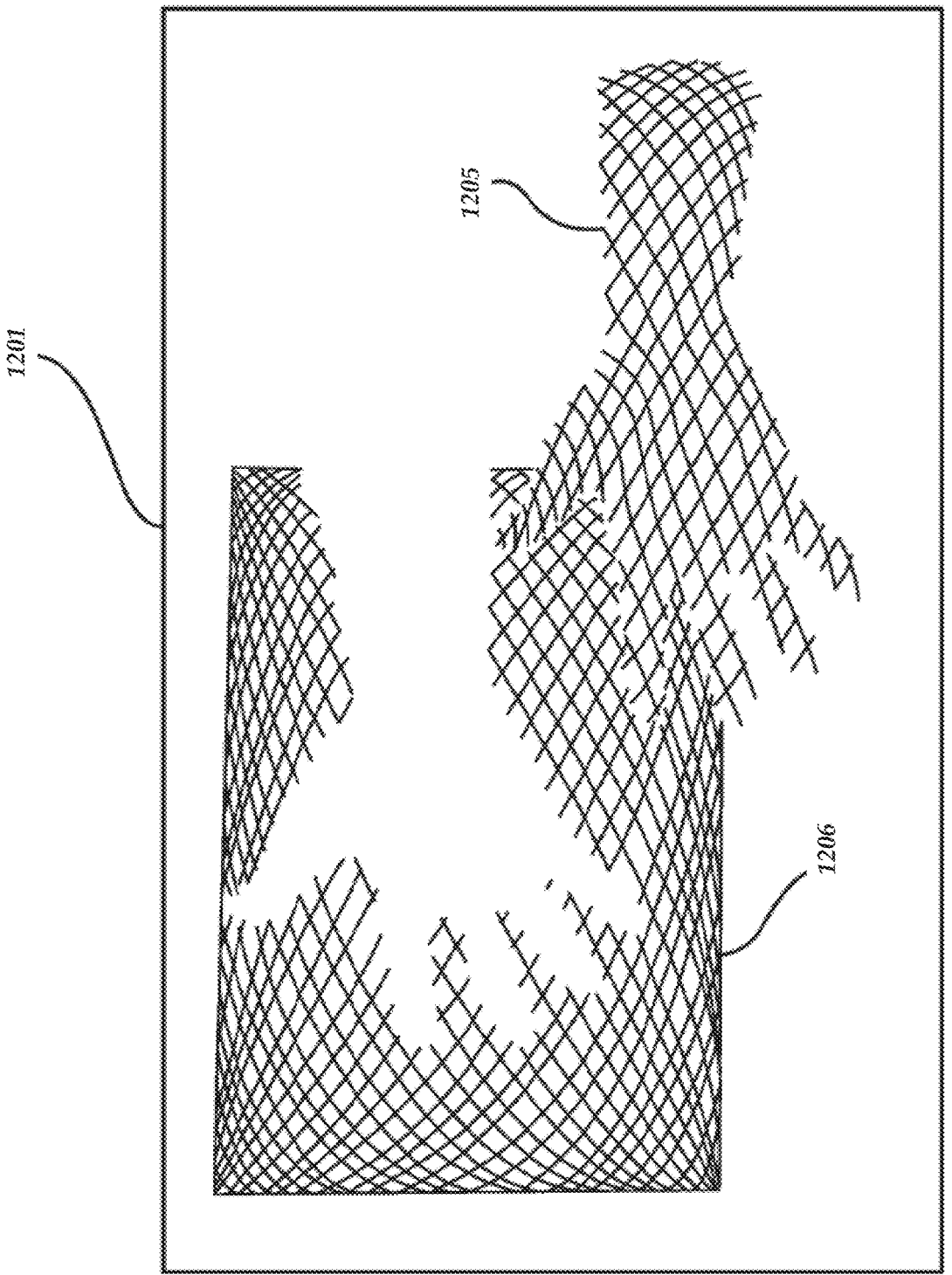
FIG. 12 illustrates a representation of how the shape or position of trajectories may correspond to the shapes or positions of subjects that may be scanned in scenes in accordance with one or more of the various embodiments.

FIG. 12 illustrates a representation of how the shape or position of trajectories may correspond to the shapes or positions of subjects that may be scanned in scenes in accordance with one or more of the various embodiments. It this example, scene 1201 may be scanned by beam generators, such as, laser beams from scanning systems, beam generators, signal generators, or otherwise. Accordingly, in some embodiments, a pattern of paths may be scanned across surface 1206. Also, in this example, shape 1205 may be distinguished from the background scene based on deformations or translations in the trajectories (e.g., paths) that result from the shape or position of the shape 1205 as compared to the background or other shapes that may be included in scene.

Also, it will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as may arise in a multi-processor computer system. In addition, one or more blocks or combinations of blocks in each flowchart illustration may also be performed concurrently with other blocks or combinations of blocks, or even in a different sequence than illustrated without departing from the scope or spirit of the innovations.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators may be referred to above as lasers, scanning lasers, beams, beam generators, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for calibrating a system using one or more processors that are configured to execute instructions, wherein the instructions perform actions, comprising:

scanning a plurality of paths of one or more beams across a first object and a second object, wherein the plurality of paths are generated by a projector, and wherein the first object is disposed between the second object and the projector;

determining a plurality of trajectories based on the one or more beams scanned on the plurality of paths across the first object and the second object;

employing one or more breaks in one or more of the plurality of paths to determine a first portion of the plurality of trajectories that correspond to a first portion of the one or more paths scanned across the first object, wherein the one or more breaks in the one or more paths are employed to determine a second portion of the plurality of trajectories that correspond to a second portion of the one or more paths scanned across the second object;

determining one or more first endpoints of the first portion of the trajectories and determining one or more second endpoints of the second portion of the trajectories based on the one or more breaks in the one or more paths;

determining two or more rays separated by the one or more breaks caused by a depth between the first object and the second object and are disposed along a first portion and a second portion of a corresponding trajectory based on the one or more second endpoints and the one or more first endpoints;

determining an origin point of the one or more beams generated by the projector based on an intersection of the two or more rays; and calibrating the system based on the origin point for the projector.

2. The method of claim 1, wherein determining the origin point for the projector, further comprises:

determining two or more intersections based on a bundle of three or more determined rays; and updating the origin point based on an average location of the two or more intersections.

3. The method of claim 1, wherein determining the plurality of trajectories, further comprises:

determining another portion of the plurality of trajectories based on one or more other paths that trace across two or more other objects that are scanned by the projector;

determining two or more other rays based on one or more endpoints associated with the other portion of the plurality of trajectories; and updating the origin point of the projector based on an intersection of the two or more other rays.

4. The method of claim 1, wherein determining the plurality of trajectories, further comprises:

generating a plurality of events based on energy from the beam that is reflected to a sensor by one or more of the first object or the second object, wherein each event is associated with an x-axis value and a y-axis value that corresponds to a pixel location in the sensor, and wherein each event is associated with a timestamp that corresponds to a time the event is generated; and wherein the plurality of trajectories are based on one or more portions of the plurality of events that correspond to the one or more paths.

5. The method of claim 1, further comprising:

determining one or more timestamps associated with one or more candidate trajectories, wherein each timestamp is associated with an endpoint of the one or more candidate trajectories;

excluding a portion of the one or more candidate trajectories from the plurality of trajectories based on a difference between the one or more timestamps exceeding a threshold value.

6. The method of claim 1, wherein determining the two or more rays, further comprises:

geometrically projecting each ray from a second endpoint to a first endpoint, wherein the second endpoint and the first endpoint are associated with two separate trajectories that are associated with a same path.

7. The method of claim 1, further comprising:

determining a positional disparity between the first object and the second object based on the plurality of trajectories; and associating a confidence score with the origin point based on a value of the positional disparity, wherein the confidence score is proportional to a magnitude of the positional disparity.

8. A processor readable non-transitory storage media that includes instructions for calibrating a system, wherein execution of the instructions by one or more processors on one or more network computers performs actions, comprising:

scanning a plurality of paths of one or more beams across a first object and a second object, wherein the plurality of paths are generated by a projector, and wherein the first object is disposed between the second object and the projector, determining a plurality of trajectories based on the one or more beams scanned on the plurality of paths across the first object and the second object;

employing one or more breaks in one or more of the plurality of paths to determine a first portion of the plurality of trajectories that correspond to a first portion of the one or more paths scanned across the first object, wherein the one or more breaks in the one or more paths are employed to determine a second portion of the plurality of trajectories that correspond to a second portion of the one or more paths scanned across the second object;

determining one or more first endpoints of the first portion of the trajectories and determining one or more second endpoints of the second portion of the trajectories based on the one or more breaks in the one or more paths;

determining two or more rays separated by the one or more breaks caused by a depth between the first object and the second object and are disposed along a first portion and a second portion of a corresponding trajectory based on the one or more second endpoints and the one or more first endpoints;

determining an origin point of the one or more beams generated by the projector based on an intersection of the two or more rays; and calibrating the system based on the origin point for the projector.

9. The media of claim 8, wherein determining the origin point for the projector, further comprises:

determining two or more intersections based on a bundle of three or more determined rays; and updating the origin point based on an average location of the two or more intersections.

10. The media of claim 8, wherein determining the plurality of trajectories, further comprises:

determining another portion of the plurality of trajectories based on one or more other paths that trace across two or more other objects that are scanned by the projector;

determining two or more other rays based on one or more endpoints associated with the other portion of the plurality of trajectories; and updating the origin point of the projector based on an intersection of the two or more other rays.

11. The media of claim 8, wherein determining the plurality of trajectories, further comprises:

generating a plurality of events based on energy from the beam that is reflected to a sensor by one or more of the first object or the second object, wherein each event is associated with an x-axis value and a y-axis value that corresponds to a pixel location in the sensor, and wherein each event is associated with a timestamp that corresponds to a time the event is generated; and wherein the plurality of trajectories are based on one or more portions of the plurality of events that correspond to the one or more paths.

12. The media of claim 8, further comprising:

determining one or more timestamps associated with one or more candidate trajectories, wherein each timestamp is associated with an endpoint of the one or more candidate trajectories;

excluding a portion of the one or more candidate trajectories from the plurality of trajectories based on a difference between the one or more timestamps exceeding a threshold value.

13. The media of claim 8, wherein determining the two or more rays, further comprises:

geometrically projecting each ray from a second endpoint to a first endpoint, wherein the second endpoint and the first endpoint are associated with two separate trajectories that are associated with a same path.

14. The media of claim 8, further comprising:

determining a positional disparity between the first object and the second object based on the plurality of trajectories; and associating a confidence score with the origin point based on a value of the positional disparity, wherein the confidence score is proportional to a magnitude of the positional disparity.

15. A network computer for calibrating a system, comprising:

a memory that stores at least instructions; and one or more processors configured to execute instructions, wherein the instructions perform actions, including:

scanning a plurality of paths of one or more beams across a first object and a second object, wherein the plurality of paths are generated by a projector, and wherein the first object is disposed between the second object and the projector;

determining a plurality of trajectories based on the one or more beams scanned on the plurality of paths across the first object and the second object;

employing one or more breaks in one or more of the plurality of paths to determine a first portion of the plurality of trajectories that correspond to a first portion of the one or more paths scanned across the first object, wherein the one or more breaks in the one or more paths are employed to determine a second portion of the plurality of trajectories that correspond to a second portion of the one or more paths scanned across the second object;

determining one or more first endpoints of the first portion of the trajectories and determining one or more second endpoints of the second portion of the trajectories based on the one or more breaks in the one or more paths;

determining two or more rays separated by the one or more breaks caused by a depth between the first object and the second object and are disposed along a first portion and a second portion of a corresponding trajectory based on the one or more second endpoints and the one or more first endpoints;

determining an origin point of the one or more beams generated by the projector based on an intersection of the two or more rays; and calibrating the system based on the origin point for the projector.

16. The network computer of claim 15, wherein determining the origin point for the projector, further comprises:

determining two or more intersections based on a bundle of three or more determined rays; and updating the origin point based on an average location of the two or more intersections.

17. The network computer of claim 15, wherein determining the plurality of trajectories, further comprises:

determining another portion of the plurality of trajectories based on one or more other paths that trace across two or more other objects that are scanned by the projector;

determining two or more other rays based on one or more endpoints associated with the other portion of the plurality of trajectories; and updating the origin point of the projector based on an intersection of the two or more other rays.

18. The network computer of claim 15, wherein determining the plurality of trajectories, further comprises:

generating a plurality of events based on energy from the beam that is reflected to a sensor by one or more of the first object or the second object, wherein each event is associated with an x-axis value and a y-axis value that corresponds to a pixel location in the sensor, and wherein each event is associated with a timestamp that corresponds to a time the event is generated; and wherein the plurality of trajectories are based on one or more portions of the plurality of events that correspond to the one or more paths.

19. The network computer of claim 15, wherein the one or more processors are configured to execute instructions, wherein the instructions perform actions further comprising:

determining one or more timestamps associated with one or more candidate trajectories, wherein each timestamp is associated with an endpoint of the one or more candidate trajectories;

excluding a portion of the one or more candidate trajectories from the plurality of trajectories based on a difference between the one or more timestamps exceeding a threshold value.

20. The network computer of claim 15, wherein determining the two or more rays, further comprises:

geometrically projecting each ray from a second endpoint to a first endpoint, wherein the second endpoint and the first endpoint are associated with two separate trajectories that are associated with a same path.

21. The network computer of claim 15, wherein the one or more processors are configured to execute instructions, wherein the instructions perform actions further comprising:

determining a positional disparity between the first object and the second object based on the plurality of trajectories; and associating a confidence score with the origin point based on a value of the positional disparity, wherein the confidence score is proportional to a magnitude of the positional disparity.

22. A system for calibrating a system, comprising:

a network computer, comprising:

a memory that stores at least instructions; and one or more processors configured to execute instructions, wherein the instructions perform actions, including:

scanning a plurality of paths of one or more beams across a first object and a second object, wherein the plurality of paths are generated by a projector, and wherein the first object is disposed between the second object and the projector;

determining a plurality of trajectories based on the one or more beams scanned on the plurality of paths across the first object and the second object;

employing one or more breaks in one or more of the plurality of paths to determine a first portion of the plurality of trajectories that correspond to a first portion of the one or more paths scanned across the first object, wherein the one or more breaks in the one or more paths are employed to determine a second portion of the plurality of trajectories that correspond to a second portion of the one or more paths scanned across the second object;

determining one or more first endpoints of the first portion of the trajectories and determining one or more second endpoints of the second portion of the trajectories based on the one or more breaks in the one or more paths;

determining two or more rays separated by the one or more breaks caused by a depth between the first object and the second object and are disposed along a first portion and a second portion of a corresponding trajectory based on the one or more second endpoints and the one or more first endpoints;

determining an origin point of the one or more beams generated by the projector based on an intersection of the two or more rays; and calibrating the system based on the origin point for the projector; and one or more client computers, comprising:

a memory that stores at least instructions; and one or more processors configured to execute instructions, wherein the instructions perform actions, including, determining one or more of the plurality paths.

23. The system of claim 22, wherein determining the origin point for the projector, further comprises:

determining two or more intersections based on a bundle of three or more determined rays; and updating the origin point based on an average location of the two or more intersections.

24. The system of claim 22, wherein determining the plurality of trajectories, further comprises:

determining another portion of the plurality of trajectories based on one or more other paths that trace across two or more other objects that are scanned by the projector;

determining two or more other rays based on one or more endpoints associated with the other portion of the plurality of trajectories; and updating the origin point of the projector based on an intersection of the two or more other rays.

25. The system of claim 22, wherein determining the plurality of trajectories, further comprises:

generating a plurality of events based on energy from the beam that is reflected to a sensor by one or more of the first object or the second object, wherein each event is associated with an x-axis value and a y-axis value that corresponds to a pixel location in the sensor, and wherein each event is associated with a timestamp that corresponds to a time the event is generated; and wherein the plurality of trajectories are based on one or more portions of the plurality of events that correspond to the one or more paths.

26. The system of claim 22, wherein the one or more processors of the network computer are configured to execute instructions, wherein the instructions perform actions further comprising: determining one or more timestamps associated with one or more candidate trajectories, wherein each timestamp is associated with an endpoint of the one or more candidate trajectories;

excluding a portion of the one or more candidate trajectories from the plurality of trajectories based on a difference between the one or more timestamps exceeding a threshold value.

27. The system of claim 22, wherein determining the two or more rays, further comprises:

geometrically projecting each ray from a second endpoint to a first endpoint, wherein the second endpoint and the first endpoint are associated with two separate trajectories that are associated with a same path.

28. The system of claim 22, wherein the one or more processors of the network computer are configured to execute instructions, wherein the instructions perform actions further comprising: determining a positional disparity between the first object and the second object based on the plurality of trajectories; and associating a confidence score with the origin point based on a value of the positional disparity, wherein the confidence score is proportional to a magnitude of the positional disparity.

* * * * *